US012568222B2

(12) United States Patent
Xu et al.

(10) Patent No.: US 12,568,222 B2
(45) Date of Patent: Mar. 3, 2026

(54) GROUP OF PICTURES SIZE DETERMINATION METHOD AND ELECTRONIC DEVICE

(71) Applicant: Alibaba (China) Co., Ltd., Hangzhou (CN)

(72) Inventors: Shengyang Xu, Hangzhou (CN); Jianhua Chen, Hangzhou (CN); Yan Ye, San Diego, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 0 days.

(21) Appl. No.: 18/590,220

(22) Filed: Feb. 28, 2024

(65) Prior Publication Data

US 2024/0298001 A1 Sep. 5, 2024

(30) Foreign Application Priority Data

Mar. 2, 2023 (CN) .......................... 202310223126.4

(51) Int. Cl.
*H04N 19/137* (2014.01)
*H04N 19/122* (2014.01)
*H04N 19/177* (2014.01)

(52) U.S. Cl.
CPC ......... *H04N 19/137* (2014.11); *H04N 19/122* (2014.11); *H04N 19/177* (2014.11)

(58) Field of Classification Search
CPC .. H04N 19/114; H04N 19/122; H04N 19/137; H04N 19/139; H04N 19/14; H04N 19/177
See application file for complete search history.

(56) References Cited

U.S. PATENT DOCUMENTS

2009/0080519 A1* 3/2009 Jeong ..................... H04N 19/63
375/E7.104
2020/0413051 A1* 12/2020 Grois ........................ G06T 7/13

OTHER PUBLICATIONS

T. N. Thi Huong, H. Phi Cong, T. V. Huu and X. Hoang Van, "Artificial Intelligence Based Adaptive GOP Size Selection for Effective Wyner-Ziv Video Coding," 2018 International Conference on Advanced Technologies for Communications (ATC), Ho Chi Minh City, Vietnam, 2018, pp. 120-124.*
B. Li, J. Han and Y. Xu, "Adaptive GOP Size Decision for Multi-Pass Video Coding Based on Hidden Markov Model," ICASSP 2021—2021 IEEE International Conference on Acoustics, Speech and Signal Processing (ICASSP), Toronto, ON, Canada, 2021, pp. 1575-1579.*
Ma et al., "Adaptive GOP structure based on motion coherence," Proceedings of SPIE, Satellite Data Compression, Communication, and Processing, vol. 7455 (Aug. 31, 2009).*

* cited by examiner

*Primary Examiner* — Shahan Ur Rahaman
(74) *Attorney, Agent, or Firm* — Finnegan, Henderson, Farabow, Garrett & Dunner, LLP

(57) ABSTRACT

Embodiments of the present disclosure provide a method, an electronic device and a computer storage medium for determining the size of group of pictures. The method includes: determining a plurality of candidate sizes; computing motion complexity of picture sets corresponding to the plurality of candidate sizes; and performing preset operation based on the motion complexity of each of the picture sets, and selecting a target size from the plurality of candidate sizes as the GOP size according to the operation result, the GOP including continuous to-be-encoded picture frames in the picture set corresponding to the target size.

16 Claims, 16 Drawing Sheets

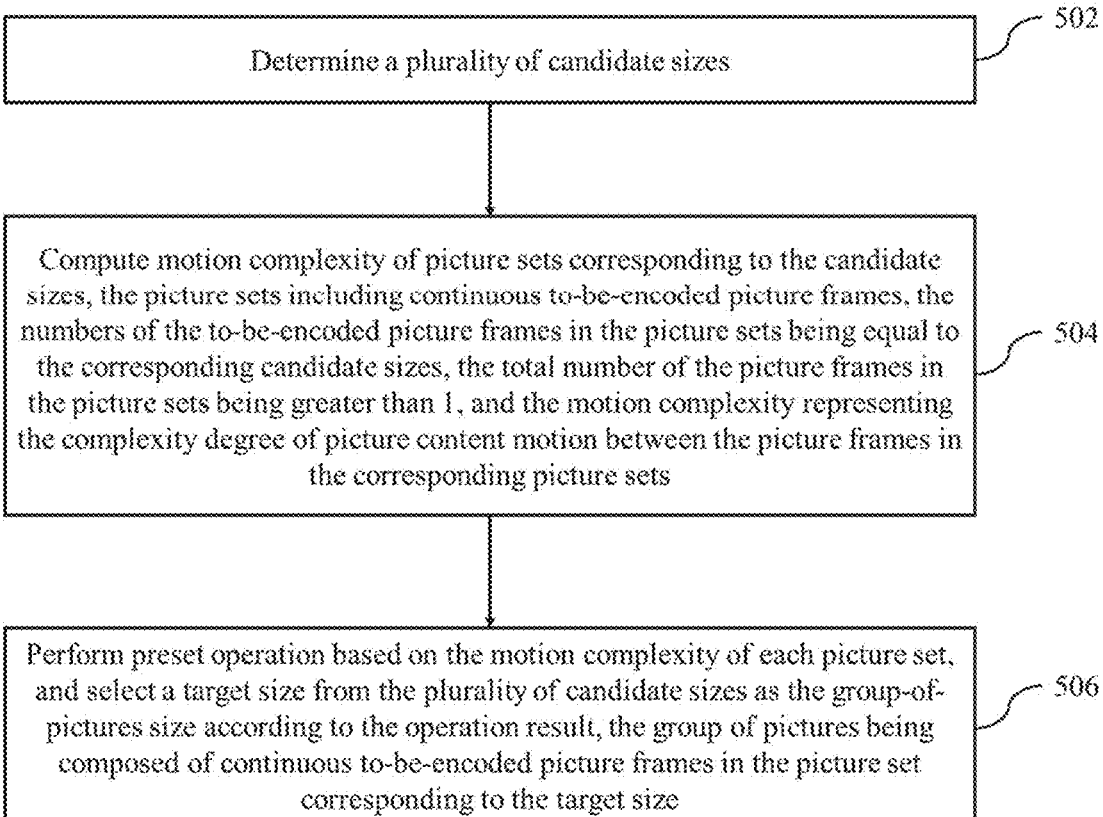

500

Determine a plurality of candidate sizes ⟋ 502

Compute motion complexity of picture sets corresponding to the candidate sizes, the picture sets including continuous to-be-encoded picture frames, the numbers of the to-be-encoded picture frames in the picture sets being equal to the corresponding candidate sizes, the total number of the picture frames in the picture sets being greater than 1, and the motion complexity representing the complexity degree of picture content motion between the picture frames in the corresponding picture sets ⟋ 504

Perform preset operation based on the motion complexity of each picture set, and select a target size from the plurality of candidate sizes as the group-of-pictures size according to the operation result, the group of pictures being composed of continuous to-be-encoded picture frames in the picture set corresponding to the target size ⟋ 506

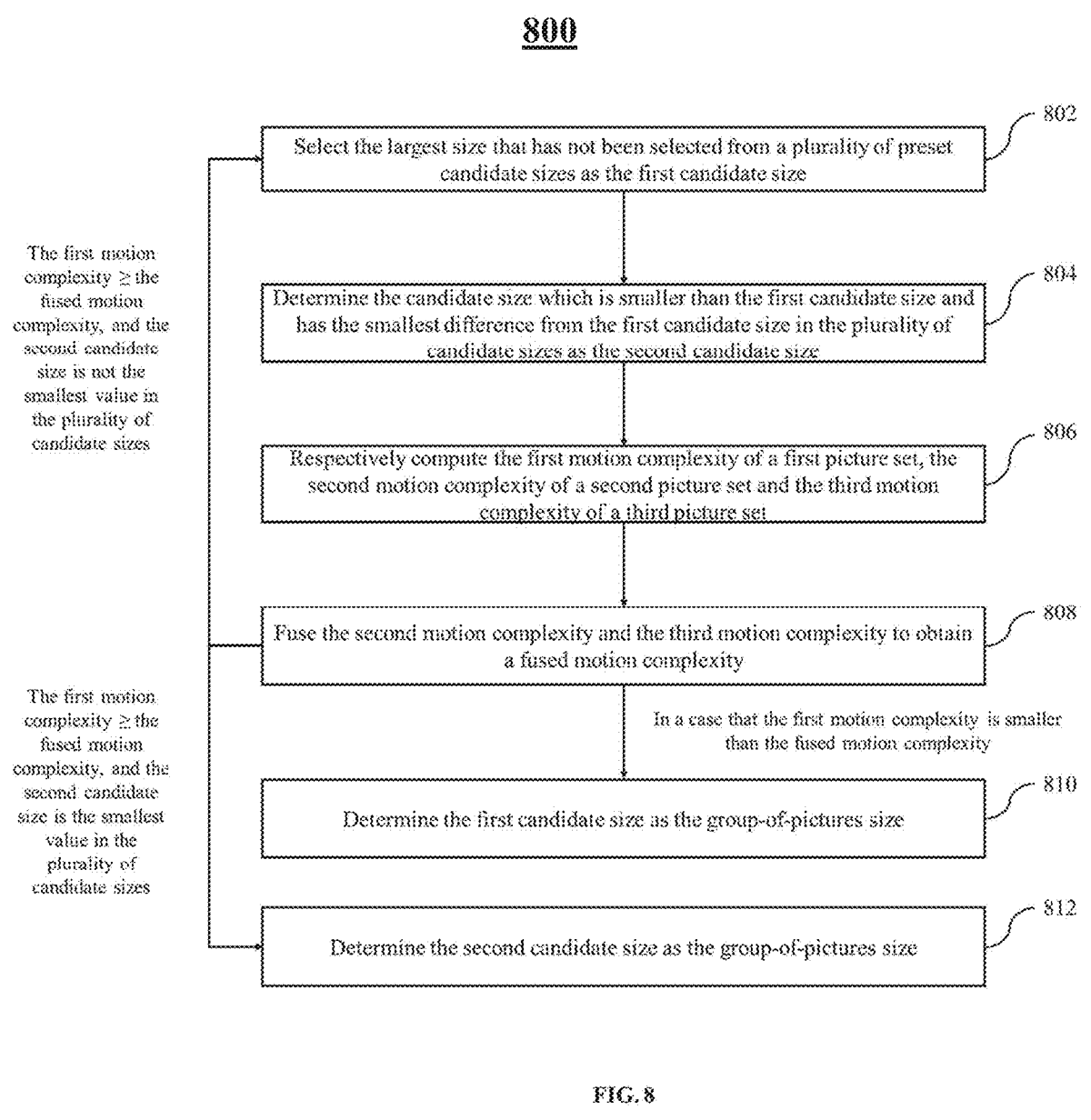

802 Select the largest size that has not been selected from a plurality of preset candidate sizes as the first candidate size The first motion complexity ≥ the fused motion complexity, and the second candidate size is not the smallest value in the plurality of candidate sizes 804 Determine the candidate size which is smaller than the first candidate size and has the smallest difference from the first candidate size in the plurality of candidate sizes as the second candidate size 806 Respectively compute the first motion complexity of a first picture set, the second motion complexity of a second picture set and the third motion complexity of a third picture set 808 Fuse the second motion complexity and the third motion complexity to obtain a fused motion complexity In a case that the first motion complexity is smaller than the fused motion complexity The first motion complexity ≥ the fused motion complexity, and the second candidate size is the smallest value in the plurality of candidate sizes 810 Determine the first candidate size as the group-of-pictures size 812 Determine the second candidate size as the group-of-pictures size

FIG. 8

GROUP OF PICTURES SIZE DETERMINATION METHOD AND ELECTRONIC DEVICE

CROSS-REFERENCE TO RELATED APPLICATIONS

The disclosure claims the benefits of priority to Chinese Application No. 202310223126.4, filed on Mar. 2, 2023, which is incorporated herein by reference in its entirety.

TECHNICAL FIELD

The present disclosure relates to the technical field of computers, and particularly relates to a method, an electronic device and a computer storage medium for determining the size of group of pictures.

BACKGROUND

In the technical field of video encoding, a set composed of a plurality of continuous picture frames in a to-be-encoded video stream is usually called a Group Of Pictures (GOP), and the size of the GOP is the number of the picture frames contained in the GOP. Common GOP types include GOP32, GOP16, GOP8, GOP4, GOP2, GOP1 and the like; and taking GOP32 as an example, it is indicated that the size of the GOP is 32, that is, this GOP includes 32 continuous picture frames.

The encoding process is generally performed in units of a single GOP, so it is needed to determine the size of the GOP before video encoding. After the size of the GOP is determined, the hierarchical structure and reference relationship among the picture frames in the GOP are correspondingly determined. And then, video encoding can be performed on each picture frame in the GOP based on the determined hierarchical structure and reference relationship.

In conventional encoding solution, for facilitating the operation, each video frame in the video stream keeps a fixed GOP size, which will lead to poor rate distortion performance of subsequent encoding results.

SUMMARY

In view of this, the disclosed embodiments of the present disclosure provide a group of pictures size determination solution, aiming to at least solve part of the above problem.

Some embodiments of the present disclosure provide a group of pictures size determination method, including: determining a plurality of candidate sizes; computing motion complexity of picture sets corresponding to the plurality of candidate sizes, each of the picture sets including continuous to-be-encoded picture frames, the numbers of the to-be-encoded picture frames in a picture set of the picture sets being equal to the corresponding candidate size of the plurality of picture sets, the total number of the picture frames in the picture sets being greater than 1, and the motion complexity representing the complexity degree of picture content motion between the picture frames in the corresponding picture set of the picture sets; and performing preset operation based on the motion complexity of each of the picture sets, and selecting a target size from the plurality of candidate sizes as the GOP size according to the operation result, the GOP including continuous to-be-encoded picture frames in the picture set corresponding to the target size.

Some embodiments of the present disclosure provide an encoding method, including: receiving continuous to-beencoded picture frames; determining a group of pictures size adopted in the encoding process by any of the methods described herein; and based on a preset encoding mode corresponding to the group of pictures size, encoding the continuous to-be-encoded picture frames in the group of pictures to obtain a video bit stream.

Some embodiments of the present disclosure provide an encoding method, including: acquiring video data; determining a group of pictures size adopted in an encoding process by any of the methods described herein, and encoding the video data based on a preset encoding mode corresponding to the group of pictures size, so as to obtain a video bit stream; and transmitting the video bit stream to a client device, so that the client device decodes the video bit stream and displays a video picture.

Some embodiments of the present disclosure provide an electronic device, including: one or more processors, a memory, a communication interface and a communication bus; wherein the one or more processors, the memory and the communication interface communicate with each other through the communication bus; the memory is configured to store instructions that are executable by the one or more processors to cause the electronic device to perform operations corresponding to any of the methods described herein.

Some embodiments of the present disclosure provide a non-transitory computer-readable storage medium storing instructions that are executable by one or more processors of a device to cause the device to perform any of the methods described herein.

BRIEF DESCRIPTION OF THE DRAWINGS

Embodiments and various aspects of the present disclosure are illustrated in the following detailed description and the accompanying figures. Various features shown in the figures are not drawn to scale.

FIG. 5 is a flowchart illustrating steps of an exemplary method for determining group of pictures size, according to some embodiments of the present disclosure.

FIG. 6 is diagram illustrating an exemplary time domain hierarchical distribution and inter-frame reference relationship among picture frames in a GOP32.

FIG. 8 is a flowchart illustrating steps of an exemplary method for determining group of pictures size, according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The present disclosure provides a solution for determining the group of pictures size based on the motion complexity of picture content in picture sets of varying sizes. By adaptively selecting the group of pictures size that matches the motion complexity of the to-be-encoded picture frame from a range of candidate sizes, the subsequent encoding process can effectively enhance the rate distortion performance of the resulting output.

The Joint Video Experts Team (JVET) of the ITU-T Video Coding Expert Group (ITU-T VCEG) and the ISO/IEC Moving Picture Expert Group (ISO/IEC MPEG) has been developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

The VVC standard has been progressing well since April 2018, and continues to include more coding technologies that provide better compression performance. VVC is based on the same hybrid video coding system that has been used in modern video compression standards such as HEVC, H.264/AVC, MPEG2, H.263, etc.

The neural network post-processing filter has been adopted in image processing. Some existing techniques utilize SEI messages for specifying post-processing filter characteristics for the neural network post-processing filter.

However, temporal upsampling towards machine vision is not considered when generating the SEI messages. Therefore, there is a need for realizing the temporal upsampling for machine vision based on SEI messages.

Figure 1:
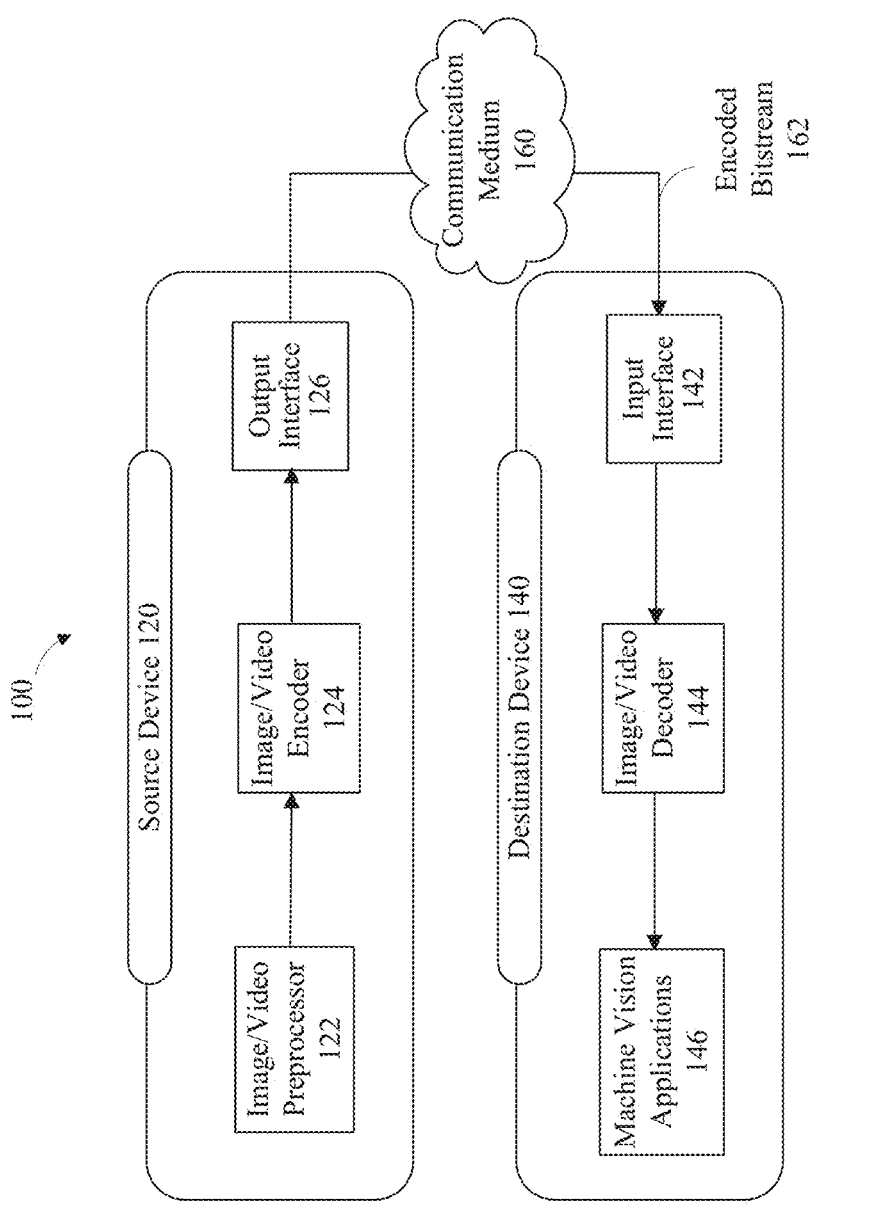
FIG. 1 is a schematic diagram illustrating an exemplary system for preprocessing and coding image data, according to some embodiments of the present disclosure.

FIG. 1 is a block diagram illustrating a system 100 for preprocessing and coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and one or more machine vision applications 146. Image/video preprocessor 122 preprocesses image data, i.e., image(s) or video(s), and generates an input bitstream for image/video encoder 124. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data, which can be utilized by machine vision applications 146.

More specifically, source device 120 may further include various devices (not shown) for providing source image data to be preprocessed by image/video preprocessor 122. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

Machine vision applications 146 include various hardware or software for utilizing the decoded image data generated by image/video decoder 144. For example, machine vision applications 146 may include a display device that displays the decoded image data to a user and may include any of a variety of display devices such as a cathode ray tube (CRT), a liquid crystal display (LCD), a plasma display, an organic light emitting diode (OLED) display, or another type of display device. As another example, machine vision applications 146 may include one or more processors configured to use the decoded image data to perform various machine-vision applications, such as object recognition and tracking, face recognition, images matching, image/video search, augmented reality, robot vision and navigation, autonomous driving, 3-dimension structure construction, stereo correspondence, motion tracking, etc.

Next, exemplary image data encoding and decoding techniques are described in connection with FIGS. 2A-2B and FIGS. 3A-3B.

Figure 2A:
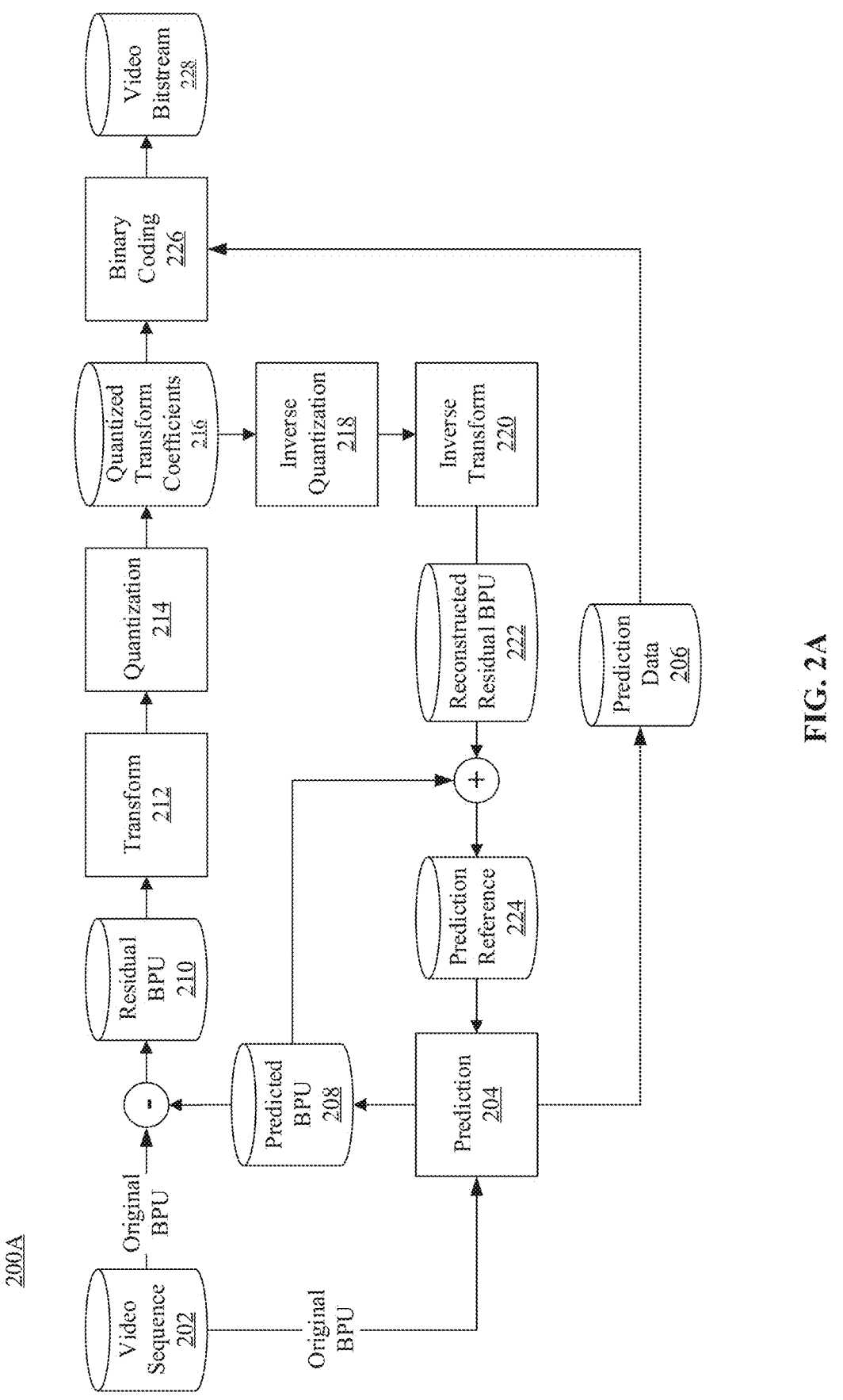
FIG. 2A is a schematic diagram illustrating an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder, such as image/video encoder 124 in FIG. 1. As shown in FIG. 2A, the encoder can encode video sequence 202 into video bitstream 228 according to process 200A. Video sequence 202 can include a set of pictures (referred to as "original pictures") arranged in a temporal order. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
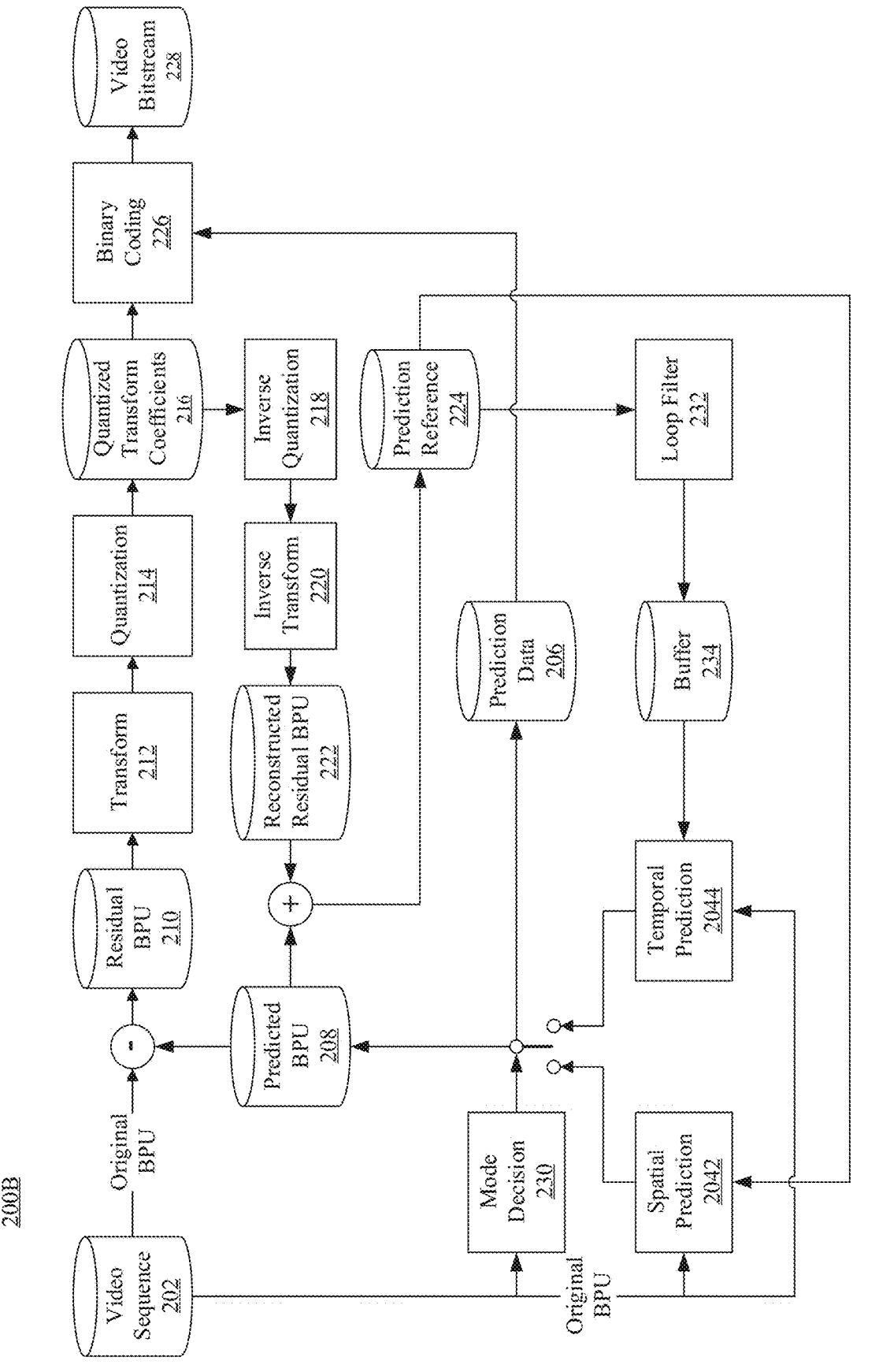
FIG. 2B is a schematic diagram illustrating another exemplary encoding process of a hybrid video coding system, consistent with embodiments of the disclosure.

FIG. 2B illustrates a schematic diagram of another example encoding process 200B, consistent with embodiments of the disclosure. For example, the encoding process 200B can be performed by an encoder, such as image/video encoder 124 in FIG. 1. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. Unidirectional inter predictions use a reference picture that precedes the current picture. Bidirectional inter predictions can use one or more reference pictures at both temporal directions with respect to the current picture.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
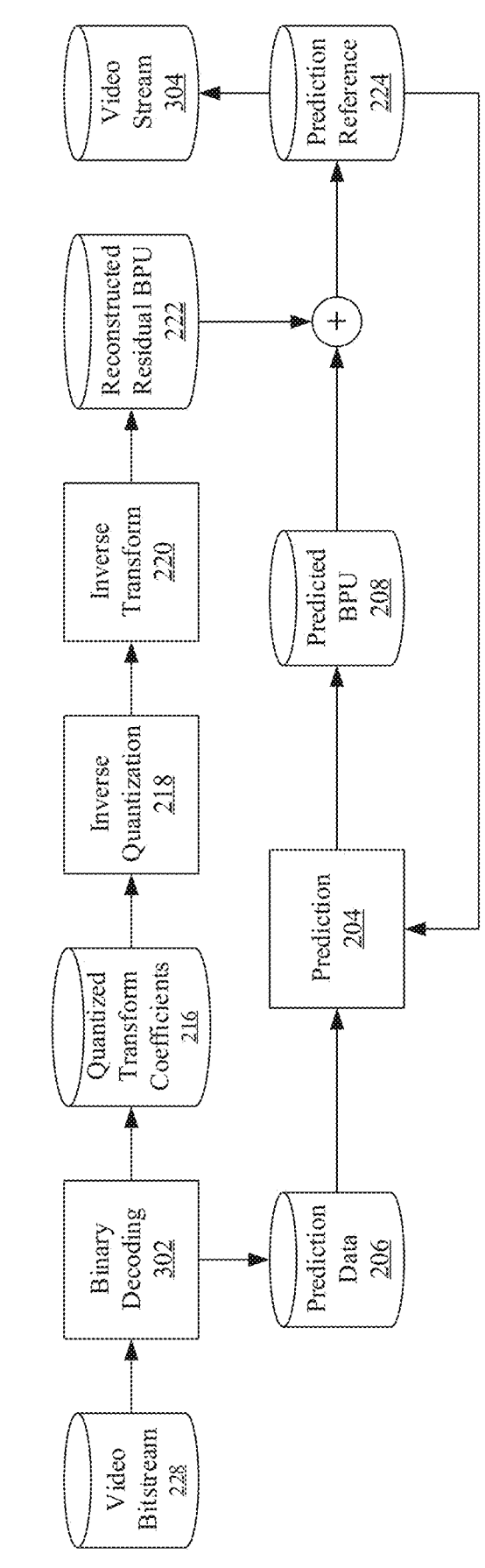
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. For example, the decoding process 300A can be performed by a decoder, such as image/video decoder 144 in FIG. 1. Process 300A can be a decompression process corresponding to the compression process 200A in FIG. 2A. In some embodiments, process 300A can be similar to the reconstruction path of process 200A. A decoder (e.g., image/video decoder 144 in FIG. 1) can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
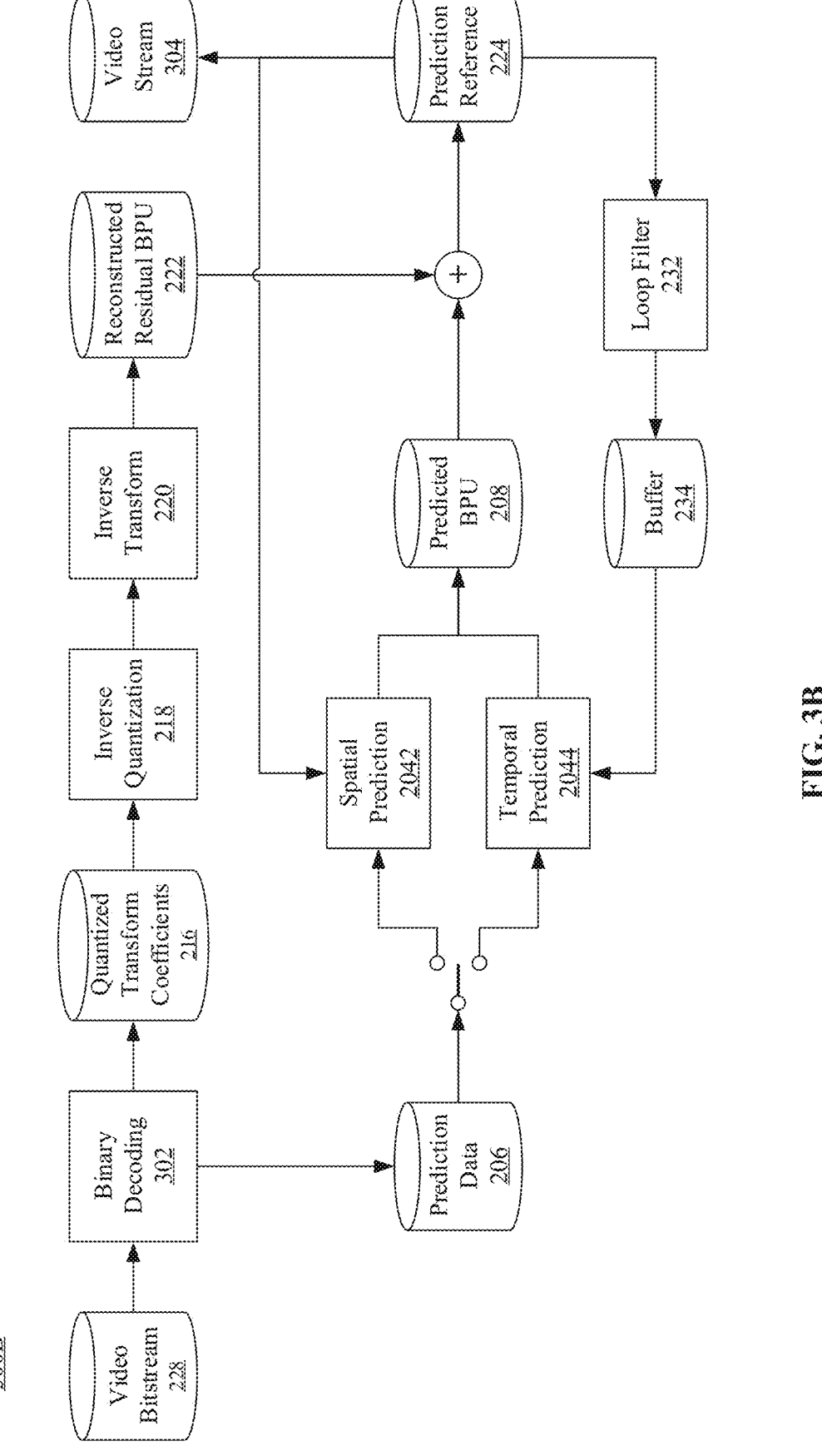
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. For example, the decoding process 300B can be performed by a decoder, such as image/video decoder 144 in FIG. 1. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
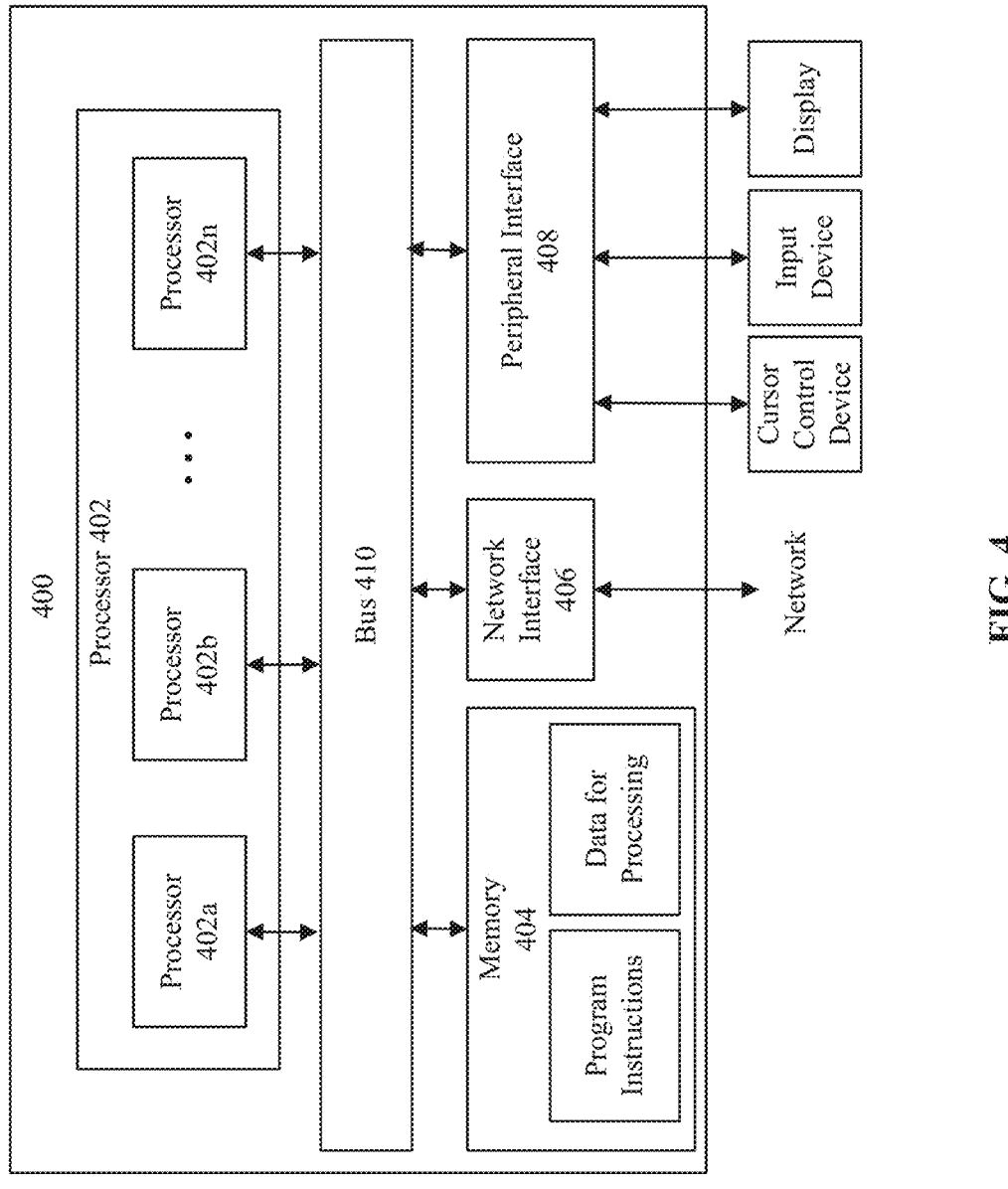
FIG. 4 is a block diagram of an exemplary apparatus for preprocessing or coding image data, according to some embodiments of the present disclosure.

Referring back to FIG. 1, each of image/video preprocessor 122, image/video encoder 124, and image/video decoder 144 may be implemented as any suitable hardware, software, or a combination thereof. FIG. 4 is a block diagram of an example apparatus 400 for processing image data, consistent with embodiments of the disclosure. For example, apparatus 400 may be a preprocessor, an encoder, or a decoder. As shown in FIG. 4, apparatus 400 can include processor 402. When processor 402 executes instructions described herein, apparatus 400 can become a specialized machine for preprocessing, encoding, or decoding image data. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

FIG. 5 is a flowchart illustrating steps of an exemplary method 500 for determining group of pictures (GOP) size, according to some embodiments of the present disclosure. As shown in FIG. 5, GOP size determination method 500 according to some embodiments of the present disclosure may include the following steps 502 to 506, which can be implemented by an encoder (e.g., encoder 124 in FIG. 1 or apparatus 400 in FIG. 4).

In step 502, the encoder determines a plurality of candidate sizes.

The candidate sizes, in some embodiments of the present disclosure, are candidate GOP sizes that can be used as GOP sizes. For example, the common candidate sizes may be 32 (the corresponding GOP type is GOP32), 16 (the corresponding GOP type is GOP16), 8 (the corresponding GOP type is GOP8), 4 (the corresponding GOP type is GOP4), 2 (the corresponding GOP type is GOP2), and 1 (the corresponding GOP type is GOP1). In this step, the plurality of candidate sizes may be determined in advance according to actual conditions. Certain embodiments of the present disclosure do not impose constraints on the approach for determining candidate sizes, the quantity of candidate sizes, or the precise magnitude of the sizes.

In step 504, the encoder computes motion complexity of picture sets corresponding to the candidate sizes. The picture sets include continuous to-be-encoded picture frames. The numbers of the to-be-encoded picture frames in the picture sets are equal to the corresponding candidate sizes, respectively. The total number of the picture frames in the picture sets is greater than 1, and the motion complexity can represent the complexity degree of picture content motion between the picture frames in the corresponding picture set.

For any candidate size in the plurality of candidate sizes determined in step 502, the picture set corresponding to this candidate size may include continuous to-be-encoded picture frames whose quantity is equal to this candidate size. The motion complexity of the picture set corresponding to this candidate size represents the complexity degree of picture content motion between the picture frames in the picture set.

The encoding process is generally performed for each to-be-encoded picture frame in a video stream including a plurality of continuous picture frames, so in the encoding process, for the video stream, there might be continuous encoded picture frames and continuous uncoded picture frames. For example, for a video stream including 100 picture frames, at a certain encoding moment, the front 50 continuous picture frames may be encoded picture frames, and the subsequent 50 continuous picture frames may be to-be-encoded picture frames.

In some embodiments of the present disclosure, the picture sets corresponding to the candidate sizes may include continuous to-be-encoded picture frames whose quantities being equal to the candidate sizes. For example, for the candidate size 32, the corresponding picture set may be a set including 32 continuous to-be-encoded picture frames from the starting to-be-encoded picture frame, and the motion complexity of the set can represent the complexity degree of the picture content motion between the 32 continuous to-be-encoded picture frames.

In addition, the picture sets corresponding to the candidate sizes may also include continuous to-be-encoded picture frames, whose quantities being equal to the candidate sizes, and other picture frames in the video stream.

For example, it may be a set with the last encoded picture frame in the video stream as the starting frame, and includes continuous to-be-encoded picture frames whose quantity is equal to the candidate size. The last encoded picture frame is the picture frame with the latest encoding time in the encoded picture frames of the video stream. Taking the candidate size 32 as an example, the corresponding picture set may be a set starting from the last encoded picture frame and including 32 continuous to-be-encoded picture frames. For example, for a video stream including 100 picture frames, at a certain encoding moment, in a case that the first 50 continuous picture frames are encoded picture frames, and the subsequent 50 continuous picture frames are to-beencoded picture frames, the picture set corresponding to the candidate size 32 may be a set with the $50^{th}$ picture frame (the last encoded picture frame) of the video stream as a starting frame and including 32 to-be-encoded picture frames, namely a picture frame set starting from the $50^{th}$ frame to the $82^{nd}$ frame.

In certain embodiments of the present disclosure, the particular representation format of the motion intricacy within the picture sets is not constrained. For example, the motion complexity of the picture sets may be obtained based on an encoding cost when encoding with the picture sets as the groups of pictures. The motion complexity of the picture sets may also be obtained based on the number of static blocks between the picture frames in the picture sets. In addition, the motion complexity of the picture set may also be obtained based on a pixel difference value between the picture frames in the picture sets.

In step 506, the encoder performs preset operation based on the motion complexity of each picture set, and selects a target size from the plurality of candidate sizes as the GOP size according to the operation result.

The GOP includes continuous to-be-encoded picture frames in the picture set corresponding to the target size. As described above, the picture set may include continuous to-be-encoded picture frames whose quantity is equal to the candidate size; and the picture set may also include continuous to-be-encoded picture frames, whose quantity is equal to the candidate size, and other picture frames in the video stream. In a case that the picture set includes the continuous to-be-encoded picture frames whose quantity is equal to the candidate sizes, the GOP is the picture set corresponding to the target size. In a case that the picture set includes the continuous to-be-encoded picture frames, whose quantity is equal to the target size, and other picture frames in the video stream, the GOP includes the continuous to-be-encoded picture frames, whose quantity is equal to the target size, and the picture set corresponding to the target size does not equate to the GOP.

After the motion complexity of the picture sets corresponding to the candidate sizes is obtained in step 504, certain operation may be performed on the motion complexity of each picture set. Then, the operation result is used as a reference factor to select one candidate size from the plurality of candidate sizes as the GOP size.

In certain embodiments of the present disclosure, the particular content of the preset operation is unconstrained and may be established based on the prevailing circumstances. For example, the size relationship of each motion complexity obtained through computation may be compared, so that the candidate size corresponding to the smallest motion complexity can be determined as the GOP size, or the candidate size corresponding to the motion complexity ranked the $N^{th}$ can be determined as the GOP size according to the sequence of the motion complexity from small to large, and N is a natural number smaller than or equal to the total number of the candidate sizes. For another example, for each motion complexity, the scaling weight may be determined based on the corresponding candidate size, the product of each motion complexity and the weight can be computed to serve as the scaled motion complexity. Then the size relationship of the scaled motion complexities is compared, and one candidate size is selected from the candidate sizes to serve as the GOP size according to the size relationship. For yet another example, each motion complexity may be used as an independent variable, a preset function expression is adopted for operation, and one candidate size is selected from the candidate sizes to serve as the GOP size based on the operation result.

It is needed to determine the GOP size before video encoding. After the GOP size is determined, the hierarchical structure and the reference relationship between the picture frames in the GOP are correspondingly determined.

Figure 6:
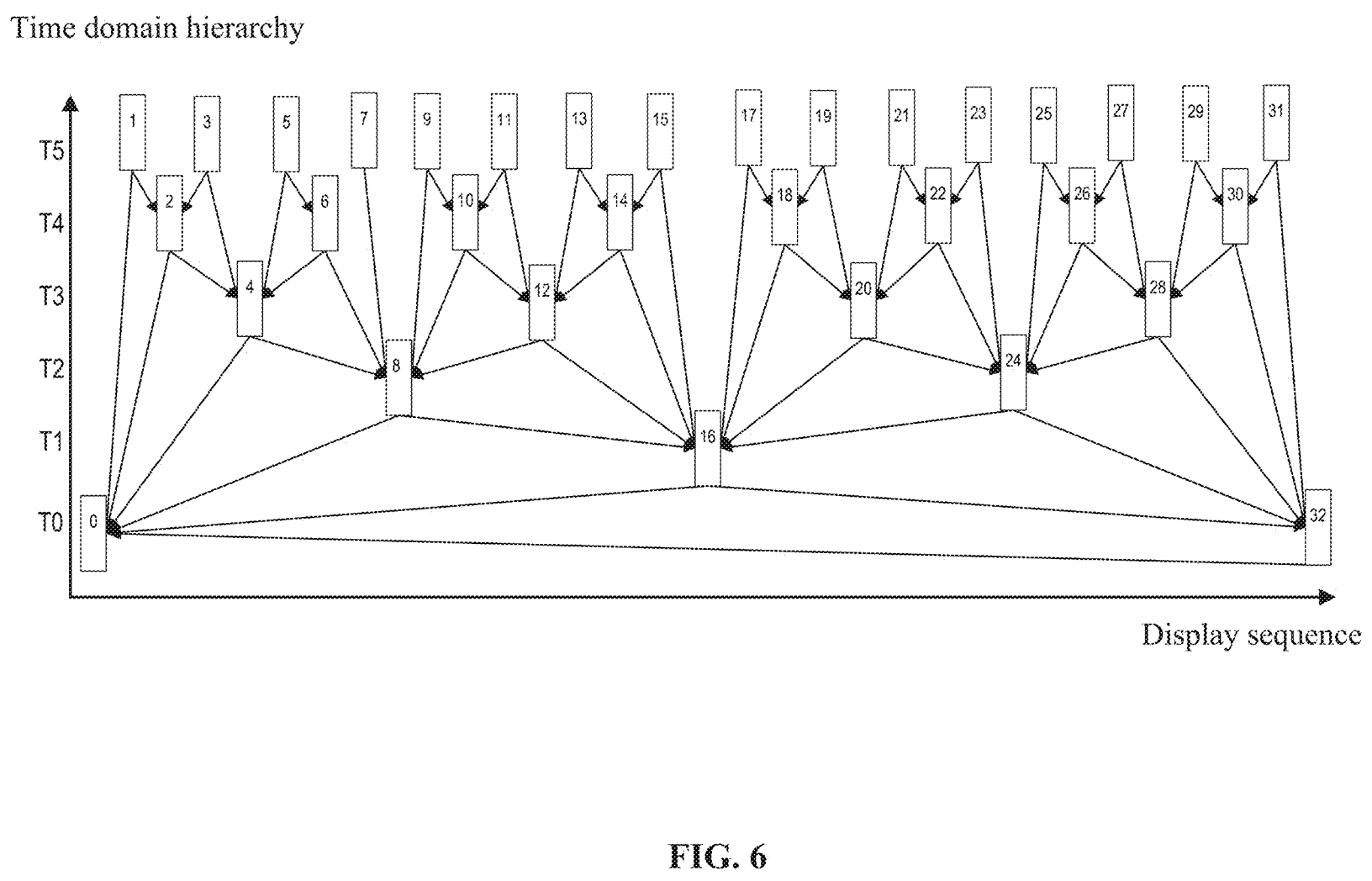

FIG. 6 is diagram illustrating an exemplary time domain hierarchical distribution and inter-frame reference relationship among picture frames in a GOP32. FIG. 6 shows the time domain layer where different picture frames are located and the reference relationship among the picture frames. For example, the GOP is internally divided into 6 time domain layers, namely, T0, T1, T2, T3, T4 and T5. The picture frames with the picture serial numbers of 0 and 32 are at the TO layer, the picture frames with the picture serial number of 16 are at the T1 layer, etc. The picture frame with the picture serial number of 16 forward refers to the picture frame with picture serial number of 0, and backward refers to the picture frame with the picture serial number of 32.

Through step 506, the GOP size matched with the motion complexity of the picture content of current to-be-encoded picture frames may be determined. Then the current continuous to-be-encoded picture frames may be encoded according to a encoding mode corresponding to the determined the GOP size so as to obtain a bit stream; and the total number of the current continuous to-be-encoded picture frames is equal to the GOP size.

Specifically, the encoding process of the video stream is usually to encode frame by frame in sequence. After the initial to-be-encoded picture frame is obtained, the current GOP size may be determined according to some embodiments of the present disclosure. Then, the picture frames whose quantity is the continuous GOP and starting from the initial to-be-encoded picture frame are encoded by the encoding mode corresponding to the GOP size, and the first to-be-encoded picture frame in the subsequently obtained video stream is used as a new initial to-be-encoded picture frame to repeat the solution provided by some embodiments of the present disclosure until the encoding operation of the whole video stream is completed.

Figure 7:
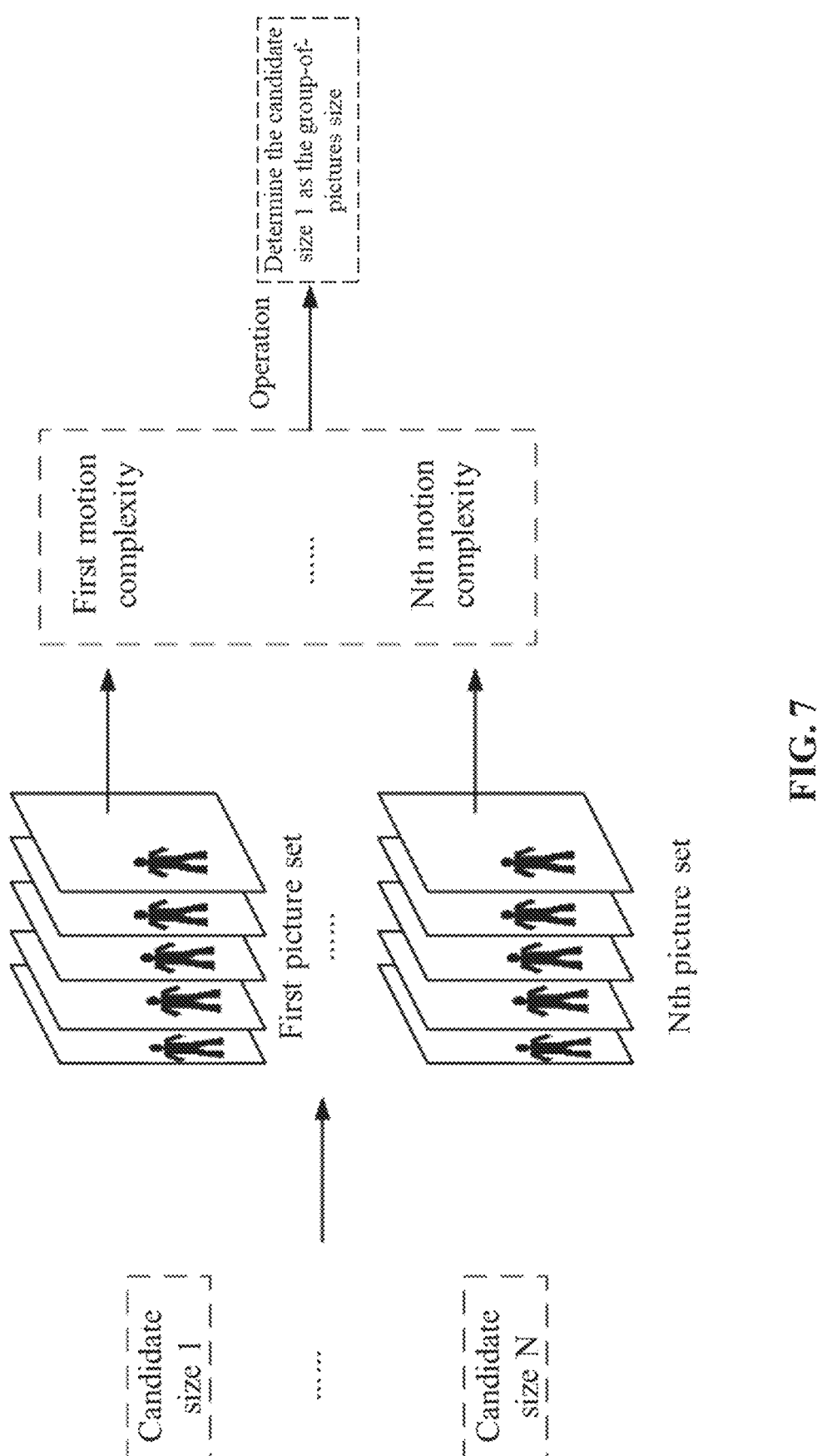
FIG. 7 is a schematic diagram illustrating an exemplary scene for implementing the method shown in FIG. 1, according to some embodiments of the present disclosure.

FIG. 7 is a schematic diagram illustrating an exemplary scene for implementing the method shown in FIG. 5, according to some embodiments of the present disclosure. As shown in FIG. 7, the exemplary scene will be used for collaboratively describing some embodiments of the present disclosure.

N candidate sizes are determined, i.e., a candidate size 1, . . . , a candidate size N, and N is a natural number greater than 1. After a plurality of candidate sizes are obtained, a first picture set corresponding to the candidate size 1, . . . , an $N^{th}$ picture set corresponding to the candidate size N are determined in the video stream. Then, the motion complexity of each picture set is computed, i.e., a first motion complexity corresponding to the first picture set, . . . , an $N^{th}$ motion complexity corresponding to the $N^{th}$ picture set. A preset operation can be performed on the determined N motion complexities to obtain an operation result. Finally, the candidate size 1 is determined as the GOP size according to the operation result.

According to the GOP size determination solution provided by some embodiments of the present disclosure, based on the motion complexity of the picture content in the picture sets with different sizes, the GOP size matched with the motion complexity of the picture content of the current to-be-encoded picture frames may be adaptively determined from the plurality of candidate sizes. Therefore, when the subsequent encoding process is performed based on the determined matched GOP size, the rate distortion performance of the encoding result can be effectively improved.

The GOP size determination method according to the some embodiments of the present disclosure may be executed by a video encoding end (e.g., encoder 104 in FIG. 1) before encoding the video stream, and is used for adaptively selecting the GOP size better matched with picture frame content from a plurality of different candidate sizes, and then performing subsequent encoding operation based on the GOP size. The video encoding end may be a client or a server. The GOP size determination method provided by some embodiments of the present disclosure may be applied to a plurality of different scenes, for example, a video-on-demand scene, and the corresponding video encoding end is a (cloud) server. Specifically, a (cloud) server device may determine a GOP size adopted when locally stored video media data (such as movie, television plays and other film and television work data) are encoded through the GOP size determination method provided by some embodiments of the present disclosure, and then the video media data are encoded based on an encoding mode corresponding to the GOP size so as to obtain the video bit stream. The video bit stream can then be issued to the client device to be decoded in the client device to obtain corresponding video media data and playing the video media data. For another example, the GOP size determination method provided by some embodiments of the present disclosure can be applied to storage and streaming transmission of a conventional video game. Specifically, the GOP size involved in the encoding process may be determined through the GOP size determination method provided by some embodiments of the present disclosure, and then the determined GOP size is adopted to encode the video content to form a corresponding video code stream so as to be stored and transmitted in a video stream service or other similar applications. For yet another example, the GOP size determination method provided by some embodiments of the present disclosure can be applied to low-delay scenes such as a video conference and a video live broadcast, and the corresponding video encoding end is a client-conference terminal. Specifically, conference video data may be collected through a video collection device. The GOP size involved in the encoding process is determined through the GOP size determination method provided by some embodiments of the present disclosure. Then the collected conference video data are encoded by the determined GOP size to form a corresponding video code stream. The video code stream can be transmitted to a conference terminal; and the conference terminal decodes the video code stream to obtain a corresponding conference video picture. For still another example, the GOP size determination method provided by some embodiments of the present disclosure can be applied to a virtual reality scene. The GOP size involved in the encoding process may be determined through the GOP size determination method provided by some embodiments of the present disclosure, and then the collected video data are encoded by the determined GOP size to form a corresponding video code stream. The video code stream can be transmitted to a virtual reality related device (such as virtual VR glasses). The VR device decodes the video code stream to obtain a corresponding video picture, and a corresponding VR function can be realized based on the video picture.

FIG. 8 is a flowchart illustrating steps of an exemplary method 800 for determining GOP size, according to some embodiments of the present disclosure. As shown in FIG. 8, GOP size determination method 800 according to some embodiments includes the following steps 802 to 812, which can be implemented by an encoder (e.g., encoder 124 in FIG. 1 or apparatus 400 in FIG. 4).

In step 802, the encoder selects the largest size that has not been selected from a plurality of preset candidate sizes as a first candidate size.

In step 804, the encoder determines the candidate size which is smaller than the first candidate size and has the smallest difference from the first candidate size among the plurality of candidate sizes as a second candidate size.

For example, the candidate sizes can be 32, 16, 8, 4, 2 and 1. In a case that the first candidate size is selected to be 16, the second candidate size can be determined to be 8.

In step 806, the encoder computes the first motion complexity of the first picture set, the second motion complexity of a second picture set and the third motion complexity of a third picture set, respectively.

The first picture set takes the last encoded picture frame as a starting frame, and the number of the to-be-encoded picture frames is equal to the first candidate size. The second picture set takes the last encoded picture frame as a starting frame, and the number of the to-be-encoded picture frames is equal to the second candidate size. The third picture set takes the last to-be-encoded picture frame in the second picture set as a starting frame and includes picture frames which do not belong to the second picture set in the first picture set.

For example, in a case that the first candidate size is 32 and the second candidate size is 16, the first picture set is a set starting from the last encoded picture frame (assumed to be the $i^{th}$ frame) and including 32 continuous to-be-encoded picture frames, namely a continuous picture frame set including the $(i+1)^{th}$ frame to the $(i+32)^{th}$ frame. The second picture set is a set starting from the last encoded picture frame (the $i^{th}$ frame) and includes 16 continuous to-be-encoded picture frames, namely a continuous picture frame set including the $(i+1)^{th}$ frame to the $(i+16)^{th}$ frame. The third picture set is a picture frame set starting from the $(i+16)^{th}$ picture frame, namely a continuous picture frame set including the $(i+17)^{th}$ frame to the $(i+32)^{th}$ frame.

According to some embodiments of the present disclosure, the motion complexity of the picture sets may be represented based on the encoding cost when encoding with the picture sets as the groups of pictures. In some embodiments, the motion complexity may also be represented based on the number of static blocks between the picture frames in the picture sets. In some embodiments, the motion complexity may also be represented based on the pixel difference value between the picture frames in the picture sets.

Specifically, in a case that the motion complexity of the picture sets is represented based on the encoding cost when encoding with the picture sets as the groups of pictures, step 806 may include the following steps, which can be implemented by the encoder (e.g., encoder 124 in FIG. 1 or apparatus 400 in FIG. 4).

The encoder may compute a first encoding cost when encoding with the first picture set as the GOP as the first motion complexity of the first picture set. The encoder may compute a second encoding cost when encoding with the second picture set as the GOP as the second motion complexity of the second picture set. The encoder may compute a third encoding cost when encoding with the third picture set as the GOP as the third motion complexity of the third picture set.

Further, the computing a first encoding cost when encoding with the first picture set as the GOP as the first motion complexity of the first picture set may include the following steps: selecting a first preset number of first picture frames from the first picture set, and obtaining the first encoding cost when encoding with the first picture set as the GOP based on an inter-frame encoding cost of each first picture frame.

The computing a second encoding cost when encoding with the first picture set as the GOP as the second motion complexity of the second picture set may include the following steps: selecting a second preset number of second picture frames from the second picture set, and obtaining the second encoding cost when encoding with the second picture set as the GOP based on an inter-frame encoding cost of each second picture frame.

The computing a third encoding cost when encoding with the third picture set as the GOP as the third motion complexity of the third picture set may include the following steps: selecting a third preset number of third picture frames from the third picture set, and obtaining the third encoding cost when encoding with the third picture set as the GOP based on an inter-frame encoding cost of each third picture frame.

In certain embodiments of the present disclosure, the number of the first picture frames and the selection method are unconstrained and may be established based on the prevailing circumstances. The specific mode of obtaining the first encoding cost according to the inter-frame encoding cost of each first picture frame is also not limited. For example, the tail frame at the tail and the middle frame in the middle of the first picture set may be taken as the first picture frames; the computing of the tail frame forward refers to the inter-frame encoding cost of the first frame (the first frame at the beginning of the first picture set), and the computing of the middle frame backward refers to the inter-frame encoding cost of the first frame and backward refers to the inter-frame encoding cost of the tail frame; and the sum of the two encoding costs is taken as the first encoding cost, namely the first motion complexity.

In certain embodiments of the present disclosure, the number of the second picture frames and the selection method are unconstrained and may be established based on the prevailing circumstances. The specific mode of obtaining the second encoding cost according to the inter-frame encoding cost of each second picture frame is also not limited. For example, the tail frame at the tail in the second picture set may be used as the second picture frame, the computing of the inter-frame encoding cost of the tail frame forward refers to the first frame (the first frame located at the head of the second picture set), and the inter-frame encoding cost serves as the second encoding cost, namely the second motion complexity.

In certain embodiments of the present disclosure, the number of third picture frames and the selection method are unconstrained and may be established based on the prevailing circumstances. The specific mode of obtaining the second encoding cost according to the inter-frame encoding cost of each second picture frame is also not limited. For example, the tail frame at the tail in the third picture set may be used as the third picture frame, the computing of the inter-frame encoding cost of the tail frame forward refers to the first frame (the first frame located at the beginning of the third picture set), and the inter-frame encoding cost serves as the third encoding cost, namely the third motion complexity.

Taking the first candidate size of 32, the second candidate size of 16 and the last encoded picture frame as the $i^{th}$ frame as an example, an $(i+32)^{th}$ picture frame and an $(i+16)^{th}$ picture frame may be selected from the first picture set as the first picture frames. The sum of the inter-frame encoding cost FrmInterCost $(i+32, i)$ of the $(i+32)^{th}$ frame may forward refer to the $i^{th}$ frame, and the inter-frame encoding costs FrmInterCost (i+16, i)(i+16, i+32) of the $(i+16)^{th}$ frame may forward refer to the $i^{th}$ frame and backward refer to the $(i+32)^{th}$ frame. FrmInterCost (i+32, i)+FrmInterCost (i+16, i)(i+16, i+32) is used as the first encoding cost GOP32Cost_32(i, i+32). The $(i+16)^{th}$ picture frame may be selected from the second picture set as the second picture frame. Inter-frame encoding cost FrmInterCost (i+16, i) of the $(i+16)^{th}$ frame forward referring to the $i^{th}$ frame is used as the second encoding cost. The $(i+32)^{th}$ frame may be selected from the third picture set as the third picture frame, and the inter-frame encoding cost FrmInterCost (i+32, i+16) of the $(i+32)^{th}$ frame forward referring to the $(i+16)^{th}$ frame is used as the third encoding cost.

Figure 9:
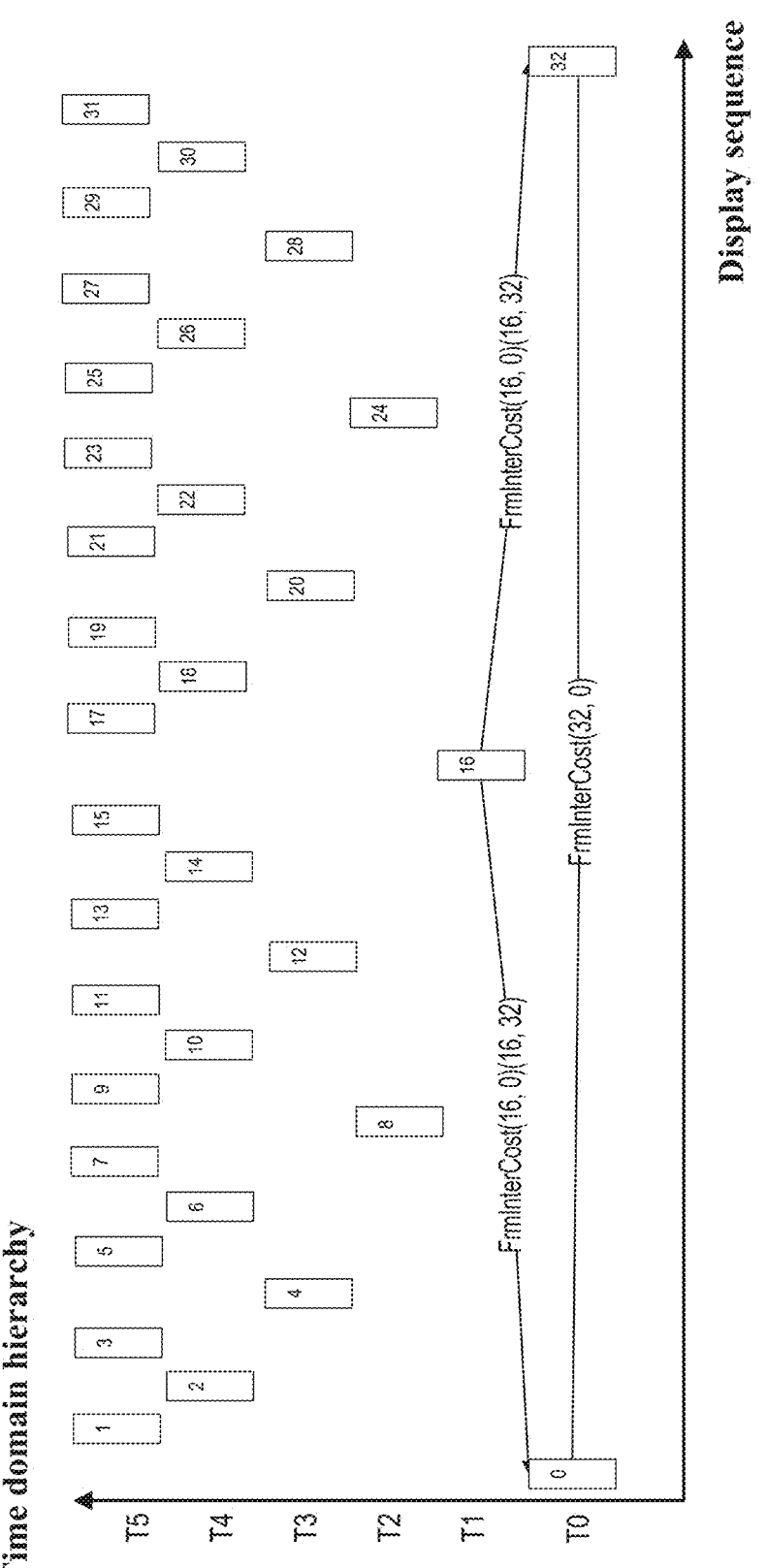
FIG. 9 is a schematic diagram illustrating an exemplary simplified encoding cost value distribution of a GOP32, according to some embodiments of the present disclosure.

FIG. 9 is a schematic diagram illustrating an exemplary simplified encoding cost value distribution of a GOP32, according to some embodiments of the present disclosure. As shown in FIG. 9, i=0, FrmInterCost (16,0)(16,32) represents the inter-frame encoding cost of the $16^{th}$ frame forward referring to the Oth frame and backward referring to the $32^{nd}$ frame. FrmInterCost (32,0) represents the inter-frame encoding cost of the $32^{nd}$ frame forward referring to the Oth frame.

Figure 10:
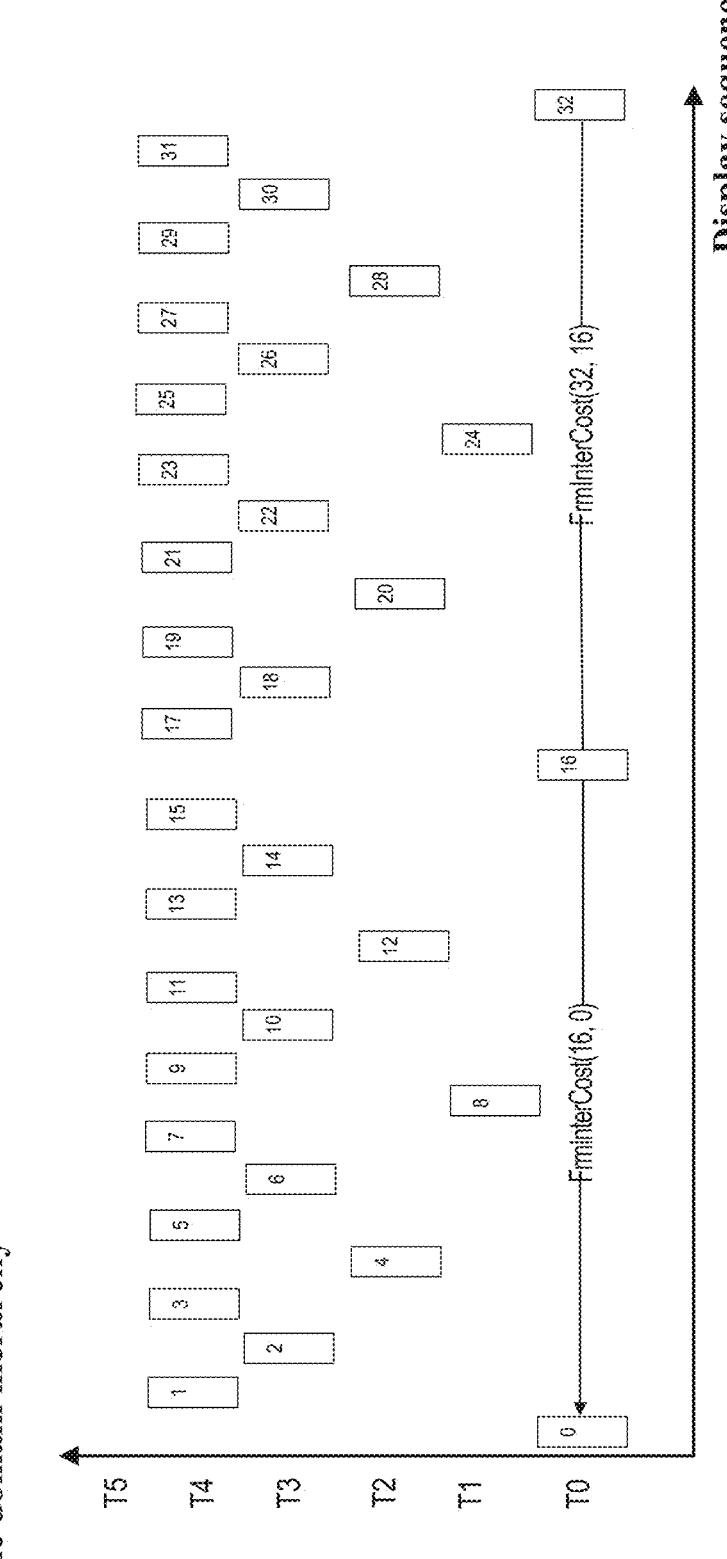
FIG. 10 is a schematic diagram illustrating an exemplary simplified encoding cost value distribution of two GOP16's, according to some embodiments of the present disclosure.

FIG. 10 is a schematic diagram illustrating an exemplary simplified encoding cost value distribution of two GOP16's, according to some embodiments of the present disclosure. As shown in FIG. 10, i=0, FrmInterCost (16,0) represents the inter-frame encoding cost of the $16^{th}$ frame forward referring to the Oth frame. FrmInterCost (32, 16) represents the inter-frame encoding cost of the $32^{nd}$ frame forward referring to the $16^{th}$ frame.

Specifically, when the motion complexity of the picture sets is expressed based on the number of static blocks between the picture frames in the picture sets, step 806 may include the following steps, which can be implemented by the encoder.

The encoder may compute the number of first static blocks between the picture frames in the first picture set, and obtain the first motion complexity of the first picture set based on the number of the first static blocks, the larger the number of the first static blocks being, the smaller the first motion complexity being.

The encoder may compute the number of second static blocks between the picture frames in the second picture set, and obtain the second motion complexity of the second picture set based on the number of the second static blocks.

The encoder may compute the number of third static blocks between the picture frames in the third picture set, and obtain the third motion complexity of the third picture set based on the number of the third static blocks.

The number of the static blocks in the picture sets may be the number of the static blocks between the plurality of preset picture frames in the corresponding picture sets. In some embodiments of the present disclosure, the specific determination mode of the number of the static blocks is not limited.

Specifically, when the motion complexity of the picture sets is expressed based on the pixel difference value between the picture frames in the picture sets, step 806 may include the following steps, which can be implemented by the encoder.

In some embodiments, the encoder may compute a pixel difference value between the picture frames in the first picture set as the first motion complexity of the first picture set;

In some embodiments, the encoder may compute a pixel difference value between the picture frames in the second picture set as the second motion complexity of the second picture set.

In some embodiments, the encoder may compute a pixel difference value between the picture frames in the third picture set as the third motion complexity of the third picture set.

The pixel difference values in the picture sets may be the pixel difference values between the plurality of preset picture frames in the corresponding picture sets. In some embodiments of the present disclosure, the specific determination mode and the specific expression form of the pixel difference value are not limited.

For example, the pixel values may be divided into a plurality of different pixel intervals according to different sizes (for example, 0-100 is the first pixel value interval, 101-200 is the second pixel interval, and 201-255 is the third pixel interval). For each picture frame, the number of pixel points of the pixel values falling into the pixel value intervals is counted to obtain the pixel value distribution condition of each picture frame, and then the pixel value distribution conditions of the picture frames are compared to obtain the pixel difference values between the picture frames.

Specifically, for example, for each picture frame, the number of pixel points falling into each pixel interval may be counted in a forms of a histogram and the like (for example, the horizontal coordinate represents the pixel value, and the longitudinal coordinate represents the number of the pixel points), a pixel value distribution diagram of the picture frame is formed, and then the pixel value distribution diagrams of the picture frames are compared to obtain the pixel difference values between the picture frames.

In step 808, the encoder fuses the second motion complexity and the third motion complexity to obtain a fused motion complexity. In a case that the first motion complexity is smaller than the fused motion complexity, step 810 can be performed by the encoder. Otherwise, in a case that the second candidate size is the smallest value in the plurality of candidate sizes, step 812 can be performed by the encoder. Moreover, in a case that the second candidate size is not the smallest value in the plurality of candidate sizes, step 802 can be repeated.

In some embodiments of the present disclosure, the specific motion complexity fusion mode is not limited, and may be determined according to actual conditions. For example, the second motion complexity and the third motion complexity may be added to obtain the fused motion complexity. In some embodiments, the weight values may be respectively distributed to the second motion complexity and the third motion complexity, and then weighted summation is performed to obtain the fused motion complexity. In some embodiments, the second motion complexity and the third motion complexity may also be used as independent variables, and a preset function expression is adopted for computing to obtain the fused motion complexity.

In step 810, the encoder determines the first candidate size as the GOP size.

In step 812, the encoder determines the second candidate size as the GOP size.

Figure 11:
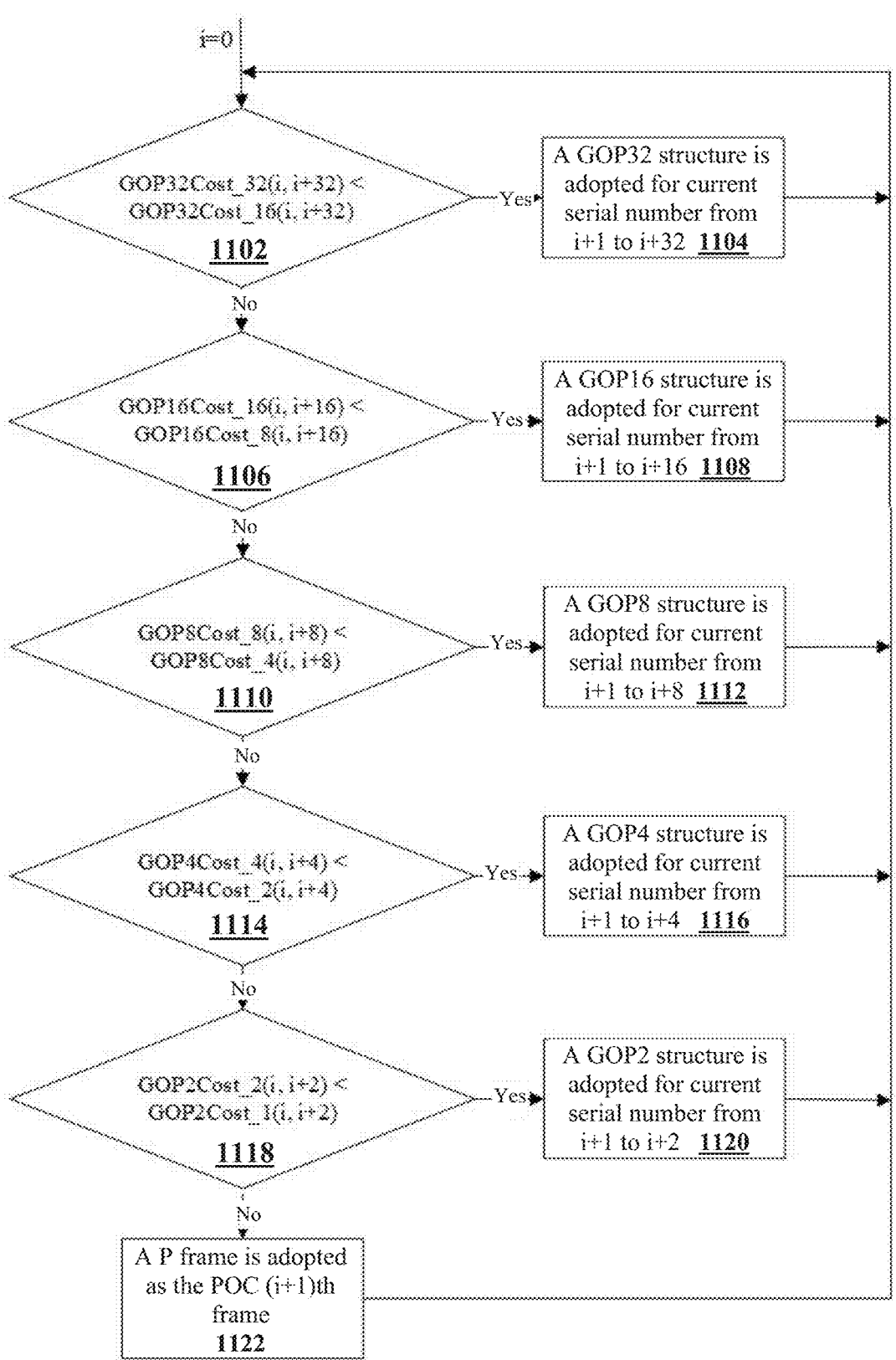
FIG. 11 is a schematic diagram illustrating an exemplary scene for implementing the method shown in FIG. 8, according to some embodiments of the present disclosure.

FIG. 11 is a schematic diagram illustrating an exemplary scene for implementing the method shown in FIG. 8, according to some embodiments of the present disclosure. As shown in FIG. 11, a specific scene example is used for describing some embodiments of the present disclosure.

It is assumed that the candidate sizes are 32, 16, 8, 4, 2 and 1 respectively. A current video stream to be encoded is acquired, and the picture serial number of the last encoded picture frame (namely the frame immediately previous to the first frame in the video stream, and the first frame is usually encoded as an I frame) in the video stream at the beginning is i=0. Moreover, 32 can be selected from the plurality of candidate sizes as the first candidate size, and 16 can be determined as the second candidate size. The first encoding costs GOP32Cost_32 (i, i+32) and a fused encoding cost GOP32Cost_16 (i, i+32) of the first picture set including the $(i+1)^{th}$ frame to the $(i+32)^{th}$ frame in the video stream are computed, where GOP32Cost_16 (i, i+32) is the sum of the second encoding cost of the second picture set including the $(i+1)^{th}$ frame to the $(i+16)^{th}$ frame in the video stream and the third encoding cost of the third picture set including the $(i+17)^{th}$ frame to the $(i+32)^{th}$ frame. When GOP32Cost_32 (i, i+32)<GOP32Cost_16 (i, i+32) is determined in step 1102, the process goes to step 1104 and the continuous picture frames from the $(i+1)^{th}$ frame to the $(i+32)^{th}$ frame are encoded by a GOP32 encoding structure. Next, i is updated by i+32, and then the process returns to step 1102 of selecting 32 from the plurality of candidate sizes as the first candidate size, and determining 16 as the second candidate size. When GOP32Cost_32 (i, i+32)>GOP32Cost_16 (i, i+32) is determined in step 1102, the process goes to step 1106 and the largest size 16 that has not been selected is selected from the candidate sizes as a new first candidate size, and correspondingly 8 may be determined as the second candidate size. The first encoding cost GOP16Cost_16 (i, i+16) and a fused encoding cost GOP16Cost_8 (i, i+16) of the first picture set including the $(i+1)^{th}$ frame to the $(i+16)^{th}$ frame in the video stream are computed, where GOP16Cost_8 (i, i+16) is the sum of the second encoding cost of the second picture set including the $(i+1)^{th}$ frame to the $(i+8)^{th}$ frame in the video stream and the third encoding cost of the third picture set including the $(i+9)^{th}$ frame to the $(i+16)^{th}$ frame. When GOP16Cost_16(i, i+16)<GOP16Cost_8(i, i+16) is determined in step 1106, the process goes to step 1108 and the continuous picture frames from the $(i+1)^{th}$ frame to the $(i+16)^{th}$ frame are encoded by a GOP16 encoding structure. Next, i is updated by i+16, and then the process returns to step 1102 of selecting 32 from the plurality of candidate sizes as the first candidate size, and determining 16 as the second candidate size. When GOP16Cost_16 (i, i+16)>GOP16Cost_8 (i, i+16) is determined in step 1106, the process goes to step 1110 and the largest size 8 that has not been selected is selected from the candidate sizes as the new first candidate size, and correspondingly 4 may be determined as the second candidate size. The first encoding cost GOP8Cost_8 (i, i+8) and a fused encoding cost GOP8Cost_4 (i, i+8) of the first picture set including the $(i+1)^{th}$ frame to the $(i+8)^{th}$ frame in the video stream are computed, where GOP8Cost_4 (i, i+8) is the sum of the second encoding cost of the second picture set including the $(i+1)^{th}$ frame to the $(i+4)^{th}$ frame in the video stream and the third encoding cost of a third picture set including the $(i+5)^{th}$ frame to the $(i+8)^{th}$ frame. When GOP8Cost_8 (i, i+8)<GOP8Cost_4 (i, i+8) is determined in step 1110, the process goes to step 1112 and the continuous picture frames from the $(i+1)^{th}$ frame to the $(i+8)^{th}$ frame are encoded by a GOP8 encoding structure. Next, i is updated by i+8, and then the process returns to step 1102 of selecting 32 from the plurality of candidate sizes as the first candidate size, and determining 16 as the second candidate size. When GOP8Cost_8 (i, i+8)>GOP8Cost_4 (i, i+8) is determined in step 1110, the process goes to step 1114 and the largest size 4 that has not been selected is selected from the candidate sizes as a new first candidate size, and correspondingly 2 may be determined as the second candidate size. The first encoding cost GOP4Cost_4 (i, i+4) and a fused encoding cost GOP4Cost_2 (i, i+4) of the first picture set including the $(i+1)^{th}$ frame to the $(i+4)^{th}$ frame in the video stream are computed, where GOP4Cost_2 (i, i+4) is the sum of the second encoding cost of the second picture set including the $(i+1)^{th}$ frame to the $(i+2)^{th}$ frame in the video stream and the third encoding cost of the third picture set including the $(i+3)^{th}$ frame to the $(i+4)^{th}$ frame. When GOP4Cost_4 (i, i+4)<GOP4Cost_2 (i, i+4) is determined in step 1114, the process goes to step 1116 and the continuous picture frames from the $(i+1)^{th}$ frame to the $(i+4)^{th}$ frame are encoded by a GOP4 encoding structure. Next, i is updated by i+4, and then the process returns to step 1102 of selecting 32 from the plurality of candidate sizes as the first candidate size, and determining 16 as the second candidate size. When GOP4Cost_4(i, i+4)>GOP4Cost_2 (i, i+4) is determined in step 1114, the process goes to step 1118 and the largest size 2 that has not been selected is selected from the candidate sizes as a new first candidate size, and correspondingly 1 may be determined as the second candidate size. The first encoding cost GOP2Cost_2 (i, i+2) and a fused encoding cost GOP2Cost_1 (i, i+2) of the first picture set including the $(i+1)^{th}$ frame to the $(i+2)^{th}$ frame in the video stream are computed, where GOP2Cost_1 (i, i+2) is the sum of the second encoding cost of the second picture set including the $(i+1)^{th}$ frame in the video stream and the third encoding cost of the third picture set including the $(i+2)^{th}$ frame. When GOP2Cost_2 (i, i+2)<GOP2Cost_1 (i, i+2) is determined in step 1118, the process goes to step 1120 and the continuous picture frames of the $(i+1)^{th}$ frame to the $(i+2)^{th}$ frame are encoded by a GOP2 encoding structure. Next, i is updated by i+2, and then the process returns to the step of selecting 32 from a plurality of candidate sizes as the first candidate size, and determining 16 as the second candidate size. When GOP2Cost_2 (i, i+2)>GOP2Cost_1 (i, i+2) is determined in step 1118, the process goes to step 1122 and the picture frame of the $(i+1)^{th}$ frame is encoded by a GOP1 encoding structure, namely the $(i+1)^{th}$ frame is encoded with a P frame. Next, i is updated by i+1, and then the process returns to step 1102 of selecting 32 from the plurality of candidate sizes as the first candidate size, and determining 16 as the second candidate size.

According to some embodiments of the present disclosure, the encoding cost can be determined based on the following formulas:

$$GOP32Cost\_32(i, i+32) = \tag{1}$$
$$FrmInterCost(i+32, i) + FrmInterCost(i+16, i)(i+16, i+32)$$

$$GOP32Cost\_16(i, i+32) = \tag{2}$$
$$FrmInterCost(i+16, i) + FrmInterCost(i+32, i+16)$$

$$GOP16Cost\_16(i, i+16) = \tag{3}$$
$$FrmInterCost(i+16, i) + FrmInterCost(i+8, i)(i+8, i+16)$$

$$GOP16Cost\_8(i, i+16) = \tag{4}$$
$$FrmInterCost(i+8, i) + FrmInterCost(i+16, i+8)$$

$$GOP8Cost\_8(i, i+8) = \tag{5}$$
$$FrmInterCost(i+8, i) + FrmInterCost(i+4, i)(i+4, i+8)$$

-continued $$GOP8Cost\_4(i, i+8) = \tag{6}$$

$$FrmInterCost(i+4, i) + FrmInterCost(i+8, i+4)$$

$$GOP4Cost\_4(i, i+4) = \tag{7}$$

$$FrmInterCost(i+4, i) + FrmInterCost(i+2, i)(i+2, i+4)$$

$$GOP4Cost\_2(i, i+4) = \tag{8}$$

$$FrmInterCost(i+2, i) + FrmInterCost(i+4, i+2)$$

where, FrmInterCost (A, B) represents the encoding cost of the $A^{th}$ picture frame forward referring to the $B^{th}$ picture frame; and FrmInterCost (C, D)(C, E) represents the encoding cost of the $C^{th}$ picture frame forward referring to the $D^{th}$ picture frame and backward referring to the Eth picture frame.

In addition, the encoding cost of each picture frame in the GOP may be computed by the following steps 1 to 3, which can be implemented by the encoder.

In step 1, the encoder may perform down-sampling on an original picture frame to obtain a down-sampled picture.

In step 2, the down-sampled picture can be divided into a plurality of processing units in a size of 8×8 by the encoder. For each processing unit, multi-angle direction prediction is performed to obtain a predicted picture of the current processing unit, then sum of absolute transformed differences (SATD) operation is performed on the processing units in the original picture frame and the corresponding processing units in the predicted picture, and the SATD values are compared to obtain the smallest SATD value, thereby obtaining the intra-frame encoding cost-CuIntraCost of each processing unit; and In step 3, the down-sampled picture can be divided into a plurality of processing units in a size of 8×8 by the encoder. For each processing unit, motion search is performed in a reference frame to obtain a plurality of predicted pictures, then SATD is computed for the processing units in the original picture and the corresponding processing units in the predicted pictures, and the SATD values are compared to obtain the smallest SATD value; the forward inter-frame encoding cost-L0_CuInterCost, the backward inter-frame encoding cost-L1 CuInterCost and the bidirectional inter-frame encoding cost-Bi_CuInterCost of each processing unit in the current reference direction are obtained; and finally, CuIntraCost, L0_CuInterCost, L1_CuInterCost and Bi_CuInterCost of each processing unit are compared to obtain the smallest value as the inter-frame encoding cost-CuInterCost of each processing unit;

Steps 2 and 3 can be sequentially performed on each processing unit in the current down-sampled picture frame to obtain CuIntraCost and CuInterCost of each processing unit of the current down-sampled picture frame. The CuIntraCost of each processing unit is accumulated to obtain the intra-frame encoding cost-FrmIntraCost of the original picture frame. CuInterCost of each processing unit is accumulated to obtain the inter-frame encoding cost-FrmInterCost of the original picture frame.

According to the GOP size determination solution provided by some embodiments of the present disclosure, based on the motion complexity of the picture content in the picture sets with different sizes, the GOP size matched with the motion complexity of the picture content of the current to-be-encoded picture frames may be adaptively determined from the plurality of candidate sizes. Therefore, when the subsequent encoding process is performed based on the determined matched GOP size, the rate distortion performance of the encoding result can be effectively improved.

In addition, according to some embodiments of the present disclosure, when selecting the GOP size, the larger size in the candidate sizes is preferentially considered; in a case that the larger size cannot meet the motion complexity requirement of the picture content, the smaller size is selected through gradual refinement; and compared with the solution that the smaller size in the candidate sizes is preferentially considered, redundant invalid judgment can be effectively reduced, and the selection process is prevented from falling into a local better solution.

Figure 12:
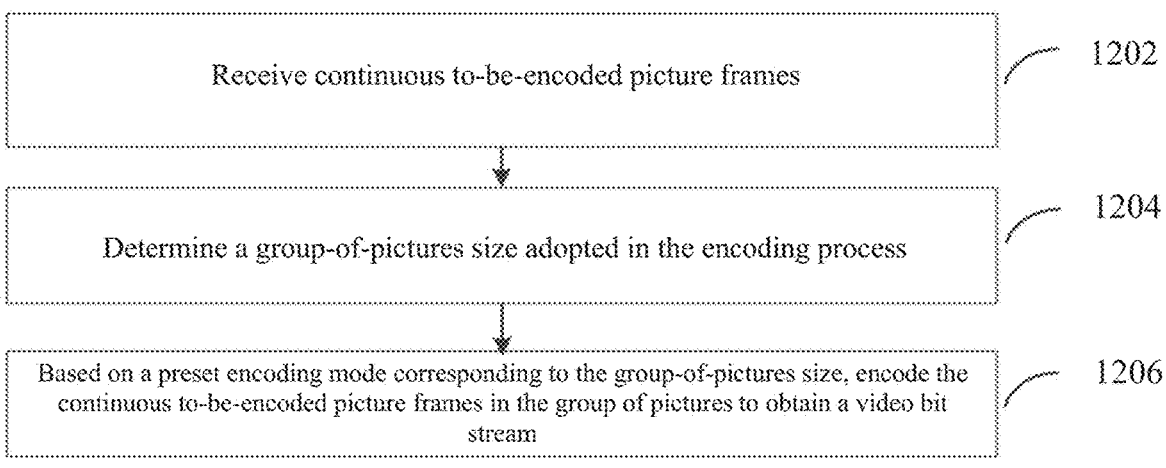
FIG. 12 is a flowchart of steps illustrating an exemplary encoding method according to some embodiments of the present disclosure.

FIG. 12 is a flowchart of steps illustrating an exemplary encoding method 1200 according to some embodiments of the present disclosure. The encoding method may be applied to a server device or client device with encoding requirements. As shown in FIG. 12, encoding method 1200 provided by some embodiments may include the following steps, which can be implemented by the server device including encoder 124 in FIG. 1 or apparatus 400 in FIG. 4, for example.

In step 1202, the server device receives continuous to-be-encoded picture frames.

In step 1204, the server device determines the GOP size adopted in the encoding process.

Specifically, this step may be realized by the GOP size determination method provided by some embodiments of the present disclosure, and is not repeated herein.

In step 1206, Based on a preset encoding mode corresponding to the GOP size, the server device encodes the continuous to-be-encoded picture frames in the GOP to obtain a video bit stream.

The encoding method according to some embodiments of the present disclosure may be executed by a video encoding end (encoder), and is used for adaptively selecting the GOP size better matched with picture frame content from a plurality of different candidate sizes, and then performing subsequent encoding operation based on the GOP size. The video encoding end may be a client or a server. The encoding method provided by some embodiments of the present disclosure may be applied to a plurality of different scenes, for example, a video-on-demand scene, and the corresponding video encoding end is a (cloud) server. Specifically, a (cloud) server device may determine a GOP size adopted when locally stored video media data (such as movie, television plays and other film and television work data) are encoded, and then the video media data are encoded based on an encoding mode corresponding to the GOP size so as to obtain the video bit stream; and the video bit stream is issued to the client device to be decoded in the client device to obtain corresponding video media data and playing the video media data. For another example: storage and streaming transmission of a conventional video game, specifically, the GOP size involved in the encoding process may be determined through the method provided by some embodiments of the present disclosure, and then the determined GOP size is adopted to encode the video content to form a corresponding video code stream so as to be stored and transmitted in a video stream service or other similar applications. For another example: low-delay scenes such as a video conference and a video live broadcast, and the corresponding video encoding end is a client-conference terminal, specifically, conference video data may be collected through a video collection device; the GOP size involved in the encoding process is determined; then the collected conference video data are encoded by the determined GOP size to form a corresponding video code stream; the video code stream is transmitted to a conference terminal; and the conference terminal decodes the video code stream to obtain a corresponding conference video picture; for another example: a virtual reality scene; the GOP size involved in the encoding process may be determined, and then the collected video data are encoded by the determined GOP size to form a corresponding video code stream; the video code stream is transmitted to a virtual reality related device (such as virtual VR glasses); the VR device decodes the video code stream to obtain a corresponding video picture; and a corresponding VR function is realized based on the video picture.

Figure 13:
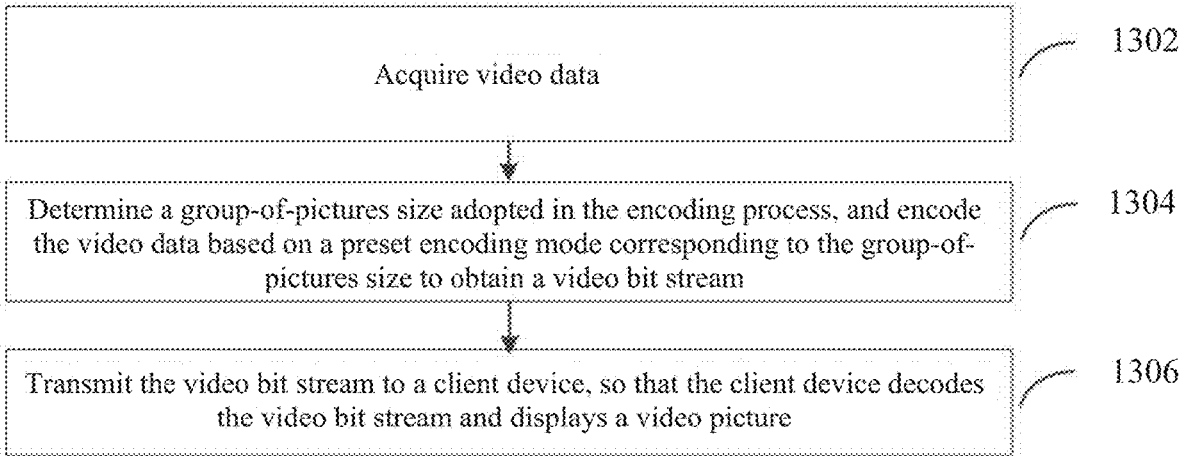
FIG. 13 is a flowchart of steps illustrating an exemplary encoding method according to some embodiments of the present disclosure.

FIG. 13 is a flowchart of steps illustrating an exemplary encoding method 1300 according to some embodiments of the present disclosure. The encoding method may be applied to a (cloud) server device with encoding requirements. As shown in FIG. 13, encoding method 1300 provided by some embodiments includes the following steps 1302 to 1306, which can be implemented by the server device including encoder 124 in FIG. 1 or apparatus 400 in FIG. 4, for example.

In step 1302, the server device acquires video data.

Specifically, the server device may acquire locally stored high-quality video data, such as movies and TV plays with high definition.

In step 1304, the server device determines the GOP size adopted in the encoding process, and encodes the video data based on a preset encoding mode corresponding to the GOP size to obtain a video bit stream.

Specifically, the GOP size may be determined by the GOP size determination method provided by some embodiments of the present disclosure in this step, and the specific determination process is not repeated herein.

After the GOP size is determined, the video data acquired in step 1302 may be encoded based on an encoding mode corresponding to the GOP size, so that a video bit stream is obtained.

In step 1306, the server device transmits the video bit stream to the client device, so that the client device can decode the video bit stream and display the video picture when receiving the video bit stream.

After the encoded video bit stream is transmitted to the client device, the client device may decode the video bit stream to obtain corresponding video data, and the video data is displayed and played in a display section.

Figure 14:
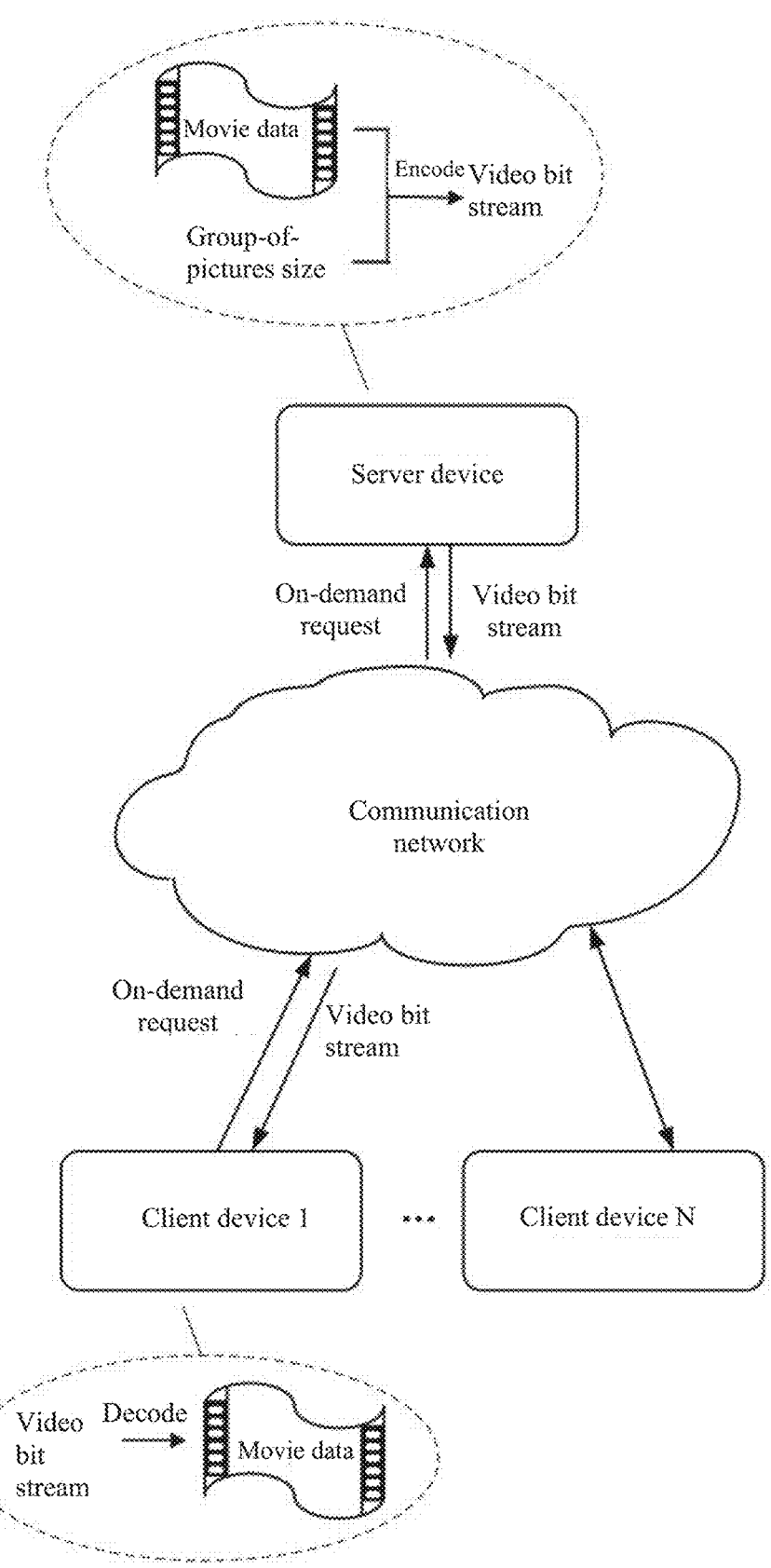
FIG. 14 is a schematic diagram illustrating an exemplary scene for implementing the method shown in FIG. 13.

FIG. 14 is a schematic diagram illustrating an exemplary scene for implementing the method shown in FIG. 13. As shown in FIG. 14, a specific scene example will be used for describing some embodiments of the present disclosure as follows:

FIG. 14 corresponds to a video data on-demand scene, and specifically, the server device is in communication connection with each client device (client device 1, . . . , client device N) through the network; when a user wants to watch a movie A, the user may transmit an on-demand request to the server device through the client device (it is assumed the client device 1); after receiving the on-demand request, the server device may determine the movie data of the movie A in a database, and the GOP size is determined by the GOP size determination method provided by some embodiments of the present disclosure; the server device encodes the movie data based on the encoding mode corresponding to the GOP size so as to obtain the video bit stream; the server device returns the video bit stream to the client device 1 through a communication network; and after receiving the video bit stream, the client device 1 may decode the video bit stream so as to obtain the movie data of the movie A, and the movie data are played in the player for the user to watch.

Figure 15:
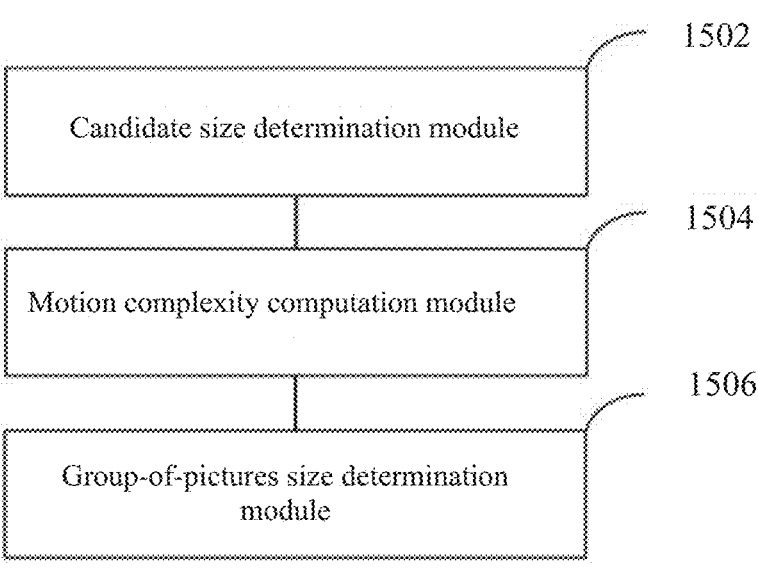
FIG. 15 is a structural block diagram illustrating an exemplary apparatus for determining group of pictures size, according to some embodiments of the present disclosure.

FIG. 15 is a structural block diagram illustrating an exemplary apparatus for determining GOP size, according to some embodiments of the present disclosure. As shown in FIG. 15, the GOP size determination apparatus provided by some embodiments of the present disclosure includes a candidate size determination module 1502, a motion complexity computation module 1504, and a GOP size determination module 1506.

Candidate size determination module 1502 includes a circuitry that is configured to determine a plurality of candidate sizes.

Motion complexity computation module 1504 includes a circuitry that is configured to compute motion complexity of picture sets corresponding to the candidate sizes, the picture sets including continuous to-be-encoded picture frames, the numbers of the to-be-encoded picture frames in the picture sets being equal to the corresponding candidate sizes, the total number of the picture frames in the picture sets being greater than 1, and the motion complexity representing the complexity degree of picture content motion between the picture frames in the corresponding picture set.

GOP size determination module 1506 includes a circuitry that is configured to perform preset operation based on the motion complexity of each picture set, and select a target size from the plurality of candidate sizes as the GOP size according to the operation result, the GOP including continuous to-be-encoded picture frames in the picture set corresponding to the target size.

In some embodiments, candidate size determination module 1502 (specifically the included circuit, the same below) is configured to determine a first candidate size and a second candidate size, the first candidate size being greater than the second candidate size.

In some embodiments, motion complexity computation module 1504 (specifically the included circuit, the same below) is configured to:

respectively compute the first motion complexity of the first picture set, the second motion complexity of a second picture set and the third motion complexity of a third picture set; and fuse the second motion complexity and the third motion complexity to obtain a fused motion complexity.

The first picture set takes the last encoded picture frame as a starting frame, and the number of the to-be-encoded picture frames is equal to the first candidate size; the second picture set takes the last encoded picture frame as a starting frame, and the number of the to-be-encoded picture frames is equal to the second candidate size; and the third picture set takes the last to-be-encoded picture frame in the second picture set as a starting frame and includes picture frames which do not belong to the second picture set in the first picture set.

In some embodiments, the GOP size determination module 1506 (specifically the included circuit, the same below) is configured to determine the first candidate size as the GOP size in a case that the first motion complexity is smaller than the fused motion complexity.

In some embodiments, candidate size determination module 1502 is specifically configured to select the largest size that has not been selected from the plurality of preset candidate sizes as the first candidate size; and determine the candidate size which is smaller than the first candidate size and has the smallest difference from the first candidate size among the plurality of candidate sizes as the second candidate size; and Candidate size determination module 1502 is also configured to return to the step of selecting the largest size that has not been selected from the plurality of preset candidate sizes as the first candidate size in a case that the first motion complexity is greater than or equal to the fused motion complexity.

In some embodiments, candidate size determination module 1502 is also configured to determine the second candidate size as the GOP size when the second candidate size is the smallest value in the plurality of candidate sizes and the first motion complexity is greater than or equal to the fused motion complexity.

In some embodiments, motion complexity computation module 1504, in the step of respectively computing the first motion complexity of the first picture set, the second motion complexity of the second picture set and the third motion complexity of the third picture set, is specifically configured to:

compute a first encoding cost when encoding with the first picture set as the GOP as the first motion complexity of the first picture set;

compute a second encoding cost when encoding with the second picture set as the GOP as the second motion complexity of the second picture set; and compute a third encoding cost when encoding with the third picture set as the GOP as the third motion complexity of the third picture set.

In some embodiments, motion complexity computation module 1504, in the step of respectively computing the first motion complexity of the first picture set, the second motion complexity of the second picture set and the third motion complexity of the third picture set, is specifically configured to:

compute the number of first static blocks between the picture frames in the first picture set, and obtain the first motion complexity of the first picture set based on the number of the first static blocks, the larger the number of the first static blocks being, the smaller the first motion complexity being;

compute the number of second static blocks between the picture frames in the second picture set, and obtain the second motion complexity of the second picture set based on the number of the second static blocks; and compute the number of third static blocks between the picture frames in the third picture set, and obtain the third motion complexity of the third picture set based on the number of the third static blocks.

In some embodiments, motion complexity computation module 1504, in the step of respectively computing the first motion complexity of the first picture set, the second motion complexity of the second picture set and the third motion complexity of the third picture set, is specifically configured to:

compute a pixel difference value between the picture frames in the first picture set as the first motion complexity of the first picture set;

compute a pixel difference value between the picture frames in the second picture set as the second motion complexity of the second picture set; and compute a pixel difference value between the picture frames in the third picture set as the third motion complexity of the third picture set.

According to some embodiments, the GOP size determination apparatus is configured to realize the corresponding GOP size determination method in the plurality of method embodiments, and has the beneficial effects of the corresponding method embodiments, which are not repeated herein. In addition, the function realization of each module in the GOP size determination apparatus in some embodiments can refer to the description of the corresponding part in some of the method embodiments, which is not repeated herein.

Figure 16:
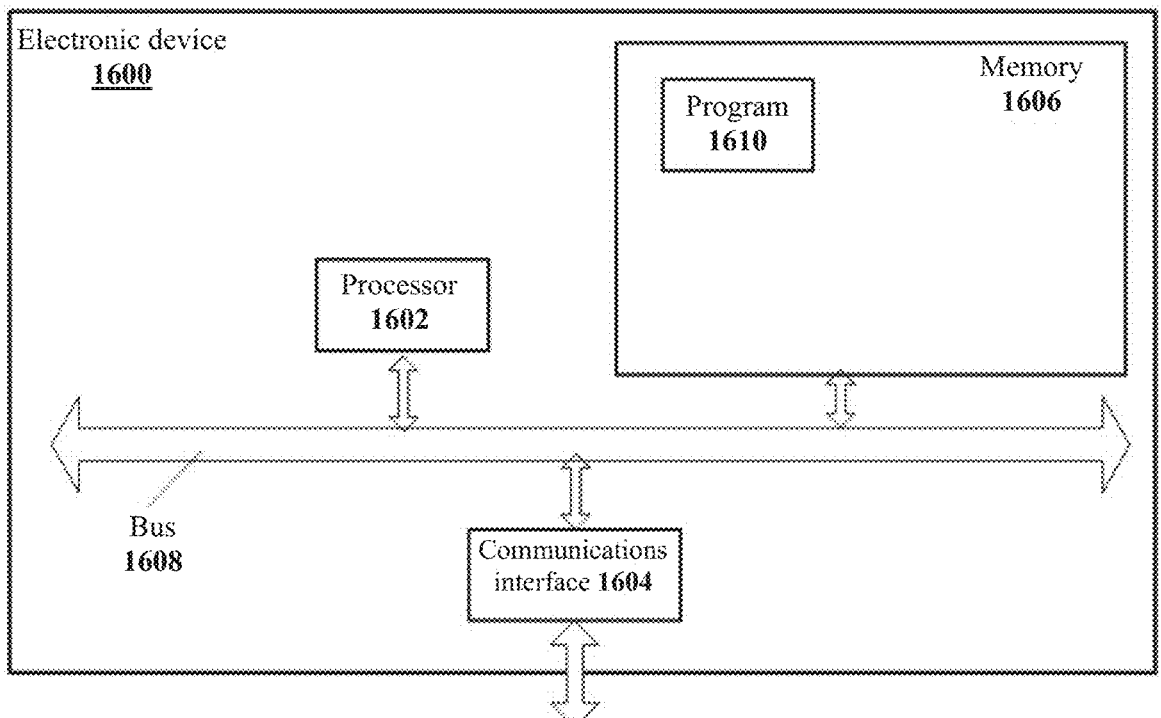
FIG. 16 is a schematic structural diagram illustrating an exemplary electronic device, according to some embodiments of the present disclosure.

FIG. 16 is a schematic structural diagram illustrating an exemplary electronic device 1600, according to some embodiments of the present disclosure. As shown in FIG. 16, electronic device 1600 may include: a processor 1602 (which can be one or more processors), a communication interface 1604, a memory 1606, and a communication bus 1608.

Processor 1602, communication interface 1604, and memory 1606 perform mutual communication through communication bus 1608.

Communication interface 1604 is configured to communicate with other electronic devices 1600 or servers (not shown).

Processor 1602 is configured to execute a program 1610, and may specifically execute related steps in some embodiments of the GOP size determination method or the encoding method.

Specifically, program 1610 may include program codes, and the program codes include computer operation instructions.

Processor 1602 may be a central processing unit (CPU), a graphics processing unit (GPU), an infrastructure processing unit (IPU), a neural processing unit (NPU), an Application Specific Integrated Circuit (ASIC), or any combination thereof, or one or more integrated circuits configured to implement some embodiments of the present disclosure. An intelligent device includes one or more processors, and the processors may be the same type of processors, such as one or more CPUs, and may also be different types of processors, such as one or more CPUs and one or more ASICs.

Memory 1606 is configured to store program 1610. Memory 1606 may include a high-speed RAM memory and may also include a non-volatile memory, such as at least one disk memory.

Program 1610 may include a plurality of computer instructions, and program 1610 specifically may enable processor 1602 to execute an operation corresponding to the GOP size determination method or the encoding method described in any one of the plurality of method embodiments through the plurality of computer instructions.

The specific implementation of each step in program 1610 may refer to the corresponding description in the corresponding step and unit in some of the method embodiments, and has corresponding beneficial effects, which are not repeated here. It is appreciated that for the convenience and simplicity of description, the specific working processes of the above-described devices and modules can be referred to the corresponding process descriptions in the foregoing method embodiments, and will not be described again herein.

Some embodiments of the present disclosure also provide a computer storage medium in which a computer program is stored; and when the program is executed by the processor, the method described by any one of the plurality of method embodiments is realized. The computer storage medium includes but is not limited to: a Compact Disc Read-Only Memory (CD-ROM), a Random Access Memory (RAM), a floppy disk, a hard disk or a magneto-optical disk and the like.

Some embodiments of the present disclosure further provide a computer program product which includes a computer instruction, and the computer instruction instructs a computing device to execute operation corresponding to any GOP size determination method or encoding method in the plurality of method embodiments.

In addition, it is to be noted that the information (including but not limited to user equipment information, user personal information and the like) and data (including but not limited to sample data used for training a model, data used for analysis, stored data, displayed data and the like) related to the user in some embodiments of the present disclosure are information and data authorized by the user or fully authorized by all parties; collection, use and processing of the related data need to comply with related laws, regulations and standards of related countries and regions; and a corresponding operation entrance is provided for the user to select authorization or rejection.

It is to be noted that according to the needs, each component/step described in the embodiments of the present disclosure can be split into more components/steps, or two or more components/steps or partial operations of components/steps can be combined into new components/steps to achieve the purpose of the embodiments of the present disclosure.

The method according to some embodiments of the present disclosure may be implemented in hardware and firmware, or implemented as software or computer code which can be stored in a recording medium (such as a CD-ROM, a RAM, a floppy disk, a hard disk or a magneto-optical disk), or implemented as a computer code which is downloaded through a network, originally stored in a remote recording medium or a non-temporary machine readable medium and to be stored in a local recording medium, so that the method described herein can be stored in such software on the recording medium using a general purpose computer, a dedicated processor or programmable or dedicated hardware (such as an Application Specific Integrated Circuit (ASIC) or a Field Programmable Gate Array (FPGA)) for processing. It may be understood that the computer, the processor, a microprocessor controller or the programmable hardware includes a storage component (such as a Random Access Memory (RAM), a Read-Only Memory (ROM), and a flash memory) which can store or receive the software or the computer code; and when the software or the computer code is accessed and executed by the computer, the processor or the hardware, the method described herein is implemented. In addition, when the general purpose computer accesses the code for implementing the method shown herein, the execution of the code converts the general purpose computer into a dedicated computer for executing the method shown herein.

It is appreciated that the exemplary units and method steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. It is appreciated that different methods can be used to implement the described functions for each particular application, but it should not be considered that the implementation goes beyond the scope of the embodiments of the present disclosure.

The above embodiments are only used to illustrate the embodiments of the present disclosure, but are not intended to limit the embodiments of the present disclosure. It is appreciated that various changes and modifications can be made without departing from the spirit and scope of the embodiments of the present disclosure, therefore all equivalent technical solutions also fall within the scope of the embodiments of the present disclosure, and the patent protection scope of the embodiments of the present disclosure should be limited by the claims. The embodiments may further be described using the following clauses:

1. A method for determining size of group of pictures (GOP), including:

determining a plurality of candidate sizes;

computing motion complexity of picture sets corresponding to the plurality of candidate sizes, each of the picture sets including continuous to-be-encoded picture frames, the numbers of the to-be-encoded picture frames in a picture set of the picture sets being equal to the corresponding candidate size of the plurality of picture sets, the total number of the picture frames in the picture sets being greater than 1, and the motion complexity representing the complexity degree of picture content motion between the picture frames in the corresponding picture set of the picture sets; and performing preset operation based on the motion complexity of each of the picture sets, and selecting a target size from the plurality of candidate sizes as the GOP size according to the operation result, the GOP including continuous to-be-encoded picture frames in the picture set corresponding to the target size.

2. The method according to clause 1, wherein determining the plurality of candidate sizes includes: determining a first candidate size and a second candidate size, the first candidate size being greater than the second candidate size; and wherein computing the motion complexity of picture sets corresponding to the plurality of candidate sizes includes:

computing the first motion complexity of a first picture set, the second motion complexity of a second picture set and the third motion complexity of a third picture set, respectively; and fusing the second motion complexity and the third motion complexity to obtain a fused motion complexity;

wherein the first picture set takes the last encoded picture frame as a starting frame, and the number of the to-be-encoded picture frames is equal to the first candidate size; the second picture set takes the last encoded picture frame as a starting frame, and the number of the to-be-encoded picture frames is equal to the second candidate size; and the third picture set takes the last to-be-encoded picture frame in the second picture set as a starting frame and includes picture frames which do not belong to the second picture set in the first picture set.

3. The method according to clause 2, wherein performing the preset operation based on the motion complexity of each of the picture sets, and selecting the target size from the plurality of candidate sizes as the GOP according to the operation result includes:

determining the first candidate size as the GOP size in a case that the first motion complexity is smaller than the fused motion complexity.

4. The method according to clause 3, wherein determining the first candidate size and the second candidate size includes:

selecting the largest size that has not been selected from a plurality of preset candidate sizes as the first candidate size; and determining the candidate size which is smaller than the first candidate size and has the smallest difference from the first candidate size among the plurality of candidate sizes as the second candidate size; and wherein the method further includes:

returning to selecting the largest size that has not been selected from a plurality of preset candidate sizes as the first candidate size in a case that the first motion complexity is greater than or equal to the fused motion complexity.

5. The method according to clause 4, further including:

determining the second candidate size as the GOP size when the second candidate size is the smallest value in the plurality of candidate sizes and the first motion complexity is greater than or equal to the fused motion complexity.

6. The method according to any of clauses 2 to 5, wherein computing the first motion complexity of the first picture set, the second motion complexity of the second picture set and the third motion complexity of the third picture set includes:

computing a first encoding cost when encoding with the first picture set as the GOP as the first motion complexity of the first picture set;

computing a second encoding cost when encoding with the second picture set as the GOP as the second motion complexity of the second picture set; and computing a third encoding cost when encoding with the third picture set as the GOP as the third motion complexity of the third picture set.

7. The method according to any of clauses 2 to 6, wherein computing the first motion complexity of the first picture set, the second motion complexity of the second picture set and the third motion complexity of the third picture set includes:

computing the number of first static blocks between the picture frames in the first picture set, and obtaining the first motion complexity of the first picture set based on the number of the first static blocks, the larger the number of the first static blocks being, the smaller the first motion complexity being;

computing the number of second static blocks between the picture frames in the second picture set, and obtaining the second motion complexity of the second picture set based on the number of the second static blocks; and computing the number of third static blocks between the picture frames in the third picture set, and obtaining the third motion complexity of the third picture set based on the number of the third static blocks.

8. The method according to any of clauses 2 to 7, wherein computing the first motion complexity of the first picture set, the second motion complexity of the second picture set and the third motion complexity of the third picture set includes:

computing a pixel difference value between the picture frames in the first picture set as the first motion complexity of the first picture set;

computing a pixel difference value between the picture frames in the second picture set as the second motion complexity of the second picture set; and computing a pixel difference value between the picture frames in the third picture set as the third motion complexity of the third picture set.

9. An encoding method, including:

receiving continuous to-be-encoded picture frames;

determining a group of pictures (GOP) size adopted in the encoding process by the method according to any of clauses 1 to 8; and based on a preset encoding mode corresponding to the GOP size, encoding the continuous to-be-encoded picture frames in the GOP to obtain a video bit stream.

10. An encoding method, including:

acquiring video data;

determining a group of pictures (GOP) size adopted in an encoding process by the method according to any of clauses 1 to 8;

encoding the video data based on a preset encoding mode corresponding to the GOP size, so as to obtain a video bit stream; and transmitting the video bit stream to a client device, so that the client device decodes the video bit stream and displays a video picture.

11. An electronic device, including: one or more processors, a memory, a communication interface and a communication bus; wherein the one or more processors, the memory and the communication interface communicate with each other through the communication bus; and the memory is configured to store instructions that are executable by the one or more processors to cause the electronic device to perform the method according to any of clauses 1 to 8.

12. A non-transitory computer-readable storage medium storing instructions that are executable by one or more processors of a device to cause the device to perform the method according to any of clauses 1 to 8.

13. A computer program product including a computer instruction, wherein the computer instruction instructs a computing device to execute operations corresponding to any of clauses 1 to 8.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for determining size of group of pictures (GOP), comprising:

determining a plurality of candidate sizes, wherein determining the plurality of candidate sizes comprises determining a first candidate size and a second candidate size, the first candidate size being greater than the second candidate size;

computing motion complexity of picture sets corresponding to the plurality of candidate sizes, each of the picture sets comprising continuous to-be-encoded picture frames, a number of the to-be-encoded picture frames in a picture set of the picture sets being equal to the corresponding candidate size of the plurality of picture sets, the total number of the picture frames in the picture sets being greater than 1, and the motion complexity representing a complexity degree of picture content motion between the picture frames in the corresponding picture set of the picture sets, wherein computing the motion complexity of picture sets corresponding to the plurality of candidate sizes comprises:

computing a first motion complexity of a first picture set, a second motion complexity of a second picture set, and a third motion complexity of a third picture set, respectively; and fusing the second motion complexity and the third motion complexity to obtain a fused motion complexity;

wherein the first picture set takes the last encoded picture frame as a starting frame, and the number of the to-be-encoded picture frames is equal to the first candidate size; the second picture set takes the last encoded picture frame as a starting frame, and the number of the to-be-encoded picture frames is equal to the second candidate size; and the third picture set takes the last to-be-encoded picture frame in the second picture set as a starting frame and comprises picture frames which do not belong to the second picture set in the first picture set; and performing preset operation based on the motion complexity of each of the picture sets, and selecting a target size from the plurality of candidate sizes as the GOP size according to the operation result, the GOP comprising continuous to-be-encoded picture frames in the picture set corresponding to the target size.

2. The method according to claim 1, wherein performing the preset operation based on the motion complexity of each of the picture sets, and selecting the target size from the plurality of candidate sizes as the GOP according to the operation result comprises:

determining the first candidate size as the GOP size in a case that the first motion complexity is smaller than the fused motion complexity.

3. The method according to claim 2, wherein determining the first candidate size and the second candidate size comprises:

selecting the largest size that has not been selected from a plurality of preset candidate sizes as the first candidate size; and determining the candidate size that is smaller than the first candidate size and has the smallest difference from the first candidate size among the plurality of candidate sizes as the second candidate size; and wherein the method further comprises:

returning to selecting the largest size that has not been selected from a plurality of preset candidate sizes as the first candidate size in a case that the first motion complexity is greater than or equal to the fused motion complexity.

4. The method according to claim 3, further comprising:

determining the second candidate size as the GOP size when the second candidate size is the smallest value in the plurality of candidate sizes and the first motion complexity is greater than or equal to the fused motion complexity.

5. The method according to claim 1, wherein computing the first motion complexity of the first picture set, the second motion complexity of the second picture set and the third motion complexity of the third picture set comprises:

computing a first encoding cost when encoding with the first picture set as the GOP as the first motion complexity of the first picture set;

computing a second encoding cost when encoding with the second picture set as the GOP as the second motion complexity of the second picture set; and computing a third encoding cost when encoding with the third picture set as the GOP as the third motion complexity of the third picture set.

6. The method according to claim 1, wherein computing the first motion complexity of the first picture set, the second motion complexity of the second picture set and the third motion complexity of the third picture set comprises:

computing the number of first static blocks between the picture frames in the first picture set, and obtaining the first motion complexity of the first picture set based on the number of the first static blocks, the larger the number of the first static blocks being, the smaller the first motion complexity being;

computing the number of second static blocks between the picture frames in the second picture set, and obtaining the second motion complexity of the second picture set based on the number of the second static blocks; and computing the number of third static blocks between the picture frames in the third picture set, and obtaining the third motion complexity of the third picture set based on the number of the third static blocks.

7. The method according to claim 1, wherein computing the first motion complexity of the first picture set, the second motion complexity of the second picture set and the third motion complexity of the third picture set comprises:

computing a pixel difference value between the picture frames in the first picture set as the first motion complexity of the first picture set;

computing a pixel difference value between the picture frames in the second picture set as the second motion complexity of the second picture set; and computing a pixel difference value between the picture frames in the third picture set as the third motion complexity of the third picture set.

8. An electronic device, comprising: one or more processors, a memory, a communication interface and a communication bus; wherein the one or more processors, the memory and the communication interface communicate with each other through the communication bus; and the memory is configured to store instructions that are executable by the one or more processors to cause the electronic device to perform operations for determining size of group of pictures (GOP), the operations comprising:

determining a plurality of candidate sizes, wherein determining the plurality of candidate sizes comprises determining a first candidate size and a second candidate size, the first candidate size being greater than the second candidate size;

computing motion complexity of picture sets corresponding to the plurality of candidate sizes, each of the picture sets comprising continuous to-be-encoded picture frames, a number of the to-be-encoded picture frames in a picture set of the picture sets being equal to the corresponding candidate size of the plurality of picture sets, the total number of the picture frames in the picture sets being greater than 1, and the motion complexity representing a complexity degree of picture content motion between the picture frames in the corresponding picture set of the picture sets, wherein computing the motion complexity of picture sets corresponding to the plurality of candidate sizes comprises:

computing a first motion complexity of a first picture set, a second motion complexity of a second picture set, and a third motion complexity of a third picture set, respectively; and fusing the second motion complexity and the third motion complexity to obtain a fused motion complexity;

wherein the first picture set takes the last encoded picture frame as a starting frame, and the number of the to-be-encoded picture frames is equal to the first candidate size; the second picture set takes the last encoded picture frame as a starting frame, and the number of the to-be-encoded picture frames is equal to the second candidate size; and the third picture set takes the last to-be-encoded picture frame in the second picture set as a starting frame and comprises picture frames which do not belong to the second picture set in the first picture set; and performing preset operation based on the motion complexity of each of the picture sets, and selecting a target size from the plurality of candidate sizes as the GOP size according to the operation result, the GOP comprising continuous to-be-encoded picture frames in the picture set corresponding to the target size.

9. The device according to claim 8, wherein performing the preset operation based on the motion complexity of each of the picture sets, and selecting the target size from the plurality of candidate sizes as the GOP according to the operation result comprises:

determining the first candidate size as the GOP size in a case that the first motion complexity is smaller than the fused motion complexity.

10. The device according to claim 9, wherein determining the first candidate size and the second candidate size comprises:

selecting the largest size that has not been selected from a plurality of preset candidate sizes as the first candidate size; and determining the candidate size that is smaller than the first candidate size and has the smallest difference from the first candidate size among the plurality of candidate sizes as the second candidate size; and wherein the operations further comprise:

returning to selecting the largest size that has not been selected from a plurality of preset candidate sizes as the first candidate size in a case that the first motion complexity is greater than or equal to the fused motion complexity.

11. The device according to claim 10, wherein the operations further comprise:

determining the second candidate size as the GOP size when the second candidate size is the smallest value in the plurality of candidate sizes and the first motion complexity is greater than or equal to the fused motion complexity.

12. The device according to claim 8, wherein computing the first motion complexity of the first picture set, the second motion complexity of the second picture set and the third motion complexity of the third picture set comprises:

computing a first encoding cost when encoding with the first picture set as the GOP as the first motion complexity of the first picture set;

computing a second encoding cost when encoding with the second picture set as the GOP as the second motion complexity of the second picture set; and computing a third encoding cost when encoding with the third picture set as the GOP as the third motion complexity of the third picture set.

13. The device according to claim 8, wherein computing the first motion complexity of the first picture set, the second motion complexity of the second picture set and the third motion complexity of the third picture set comprises:

computing the number of first static blocks between the picture frames in the first picture set, and obtaining the first motion complexity of the first picture set based on the number of the first static blocks, the larger the number of the first static blocks being, the smaller the first motion complexity being;

computing the number of second static blocks between the picture frames in the second picture set, and obtaining the second motion complexity of the second picture set based on the number of the second static blocks; and computing the number of third static blocks between the picture frames in the third picture set, and obtaining the third motion complexity of the third picture set based on the number of the third static blocks.

14. The device according to claim 8, wherein computing the first motion complexity of the first picture set, the second motion complexity of the second picture set and the third motion complexity of the third picture set comprises:

computing a pixel difference value between the picture frames in the first picture set as the first motion complexity of the first picture set;

computing a pixel difference value between the picture frames in the second picture set as the second motion complexity of the second picture set; and computing a pixel difference value between the picture frames in the third picture set as the third motion complexity of the third picture set.

15. A non-transitory computer-readable storage medium storing instructions that are executable by one or more processors of a device to cause the device to perform operations for determining size of group of pictures (GOP), the operations comprising:

determining a plurality of candidate sizes, wherein determining the plurality of candidate sizes comprises determining a first candidate size and a second candidate size, the first candidate size being greater than the second candidate size;

computing motion complexity of picture sets corresponding to the plurality of candidate sizes, each of the picture sets comprising continuous to-be-encoded picture frames, a number of the to-be-encoded picture frames in a picture set of the picture sets being equal to the corresponding candidate size of the plurality of picture sets, the total number of the picture frames in the picture sets being greater than 1, and the motion complexity representing a complexity degree of picture content motion between the picture frames in the corresponding picture set of the picture sets; and performing preset operation based on the motion complexity of each of the picture sets, and selecting a target size from the plurality of candidate sizes as the GOP size according to the operation result, the GOP comprising continuous to-be-encoded picture frames in the picture set corresponding to the target size, wherein computing the motion complexity of picture sets corresponding to the plurality of candidate sizes comprises:

computing a first motion complexity of a first picture set, a second motion complexity of a second picture set, and a third motion complexity of a third picture set, respectively; and fusing the second motion complexity and the third motion complexity to obtain a fused motion complexity;

wherein the first picture set takes the last encoded picture frame as a starting frame, and the number of the to-be-encoded picture frames is equal to the first candidate size; the second picture set takes the last encoded picture frame as a starting frame, and the number of the to-be-encoded picture frames is equal to the second candidate size; and the third picture set takes the last to-be-encoded picture frame in the second picture set as a starting frame and comprises picture frames which do not belong to the second picture set in the first picture set.

16. The non-transitory computer-readable according to claim 15, wherein performing the preset operation based on the motion complexity of each of the picture sets, and selecting the target size from the plurality of candidate sizes as the GOP according to the operation result comprises:

determining the first candidate size as the GOP size in a case that the first motion complexity is smaller than the fused motion complexity.

* * * * *